(12) United States Patent
Iyer et al.

(10) Patent No.: US 11,800,552 B1
(45) Date of Patent: Oct. 24, 2023

(54) SYSTEM AND METHOD OF PROVIDING A MEDIUM ACCESS CONTROL SCHEDULER

(71) Applicant: Space Exploration Technologies Corp., Hawthorne, CA (US)

(72) Inventors: Jayasuryan V. Iyer, Redmond, WA (US); Khasim Shaheed Shaik Mahammad, Milpitas, CA (US); Yashodhan Dandekar, Cupertino, CA (US); Ramakrishna Akella, San Diego, CA (US); Chen Chen, Irvine, CA (US); Phillip E. Barber, Sammamish, WA (US); Peter J. Worters, San Carlos, CA (US)

(73) Assignee: SPACE EXPLORATION TECHNOLOGIES CORP., Hawthorne, CA (US)

(*) Notice: Subject to any disclaimer, the term of this patent is extended or adjusted under 35 U.S.C. 154(b) by 0 days.

(21) Appl. No.: 17/338,522

(22) Filed: Jun. 3, 2021

Related U.S. Application Data

(60) Provisional application No. 63/035,214, filed on Jun. 5, 2020.

(51) Int. Cl.
*H04W 72/12* (2009.01)
*H04W 72/543* (2023.01)
(Continued)

(52) U.S. Cl.
CPC ..... *H04W 72/543* (2023.01); *H04W 72/1268* (2013.01); *H04W 72/23* (2023.01); *H04L 1/0003* (2013.01); *H04L 1/0009* (2013.01)

(58) Field of Classification Search
None
See application file for complete search history.

(56) References Cited

U.S. PATENT DOCUMENTS

| | | | |
|---|---|---|---|
| 6,947,445 B1* | 9/2005 | Barnhart | H04L 47/781 370/468 |
| 8,687,493 B2* | 4/2014 | Torres | H04B 7/18582 370/468 |

(Continued)

FOREIGN PATENT DOCUMENTS

| | | | |
|---|---|---|---|
| EP | 1158699 A2 * | 11/2001 | ......... H04B 7/18582 |
| EP | 1959601 A1 | 8/2008 | |

(Continued)

*Primary Examiner* — Anh Vu H Ly
(74) *Attorney, Agent, or Firm* — Polsinelli PC

(57) ABSTRACT

A method of operating an uplink scheduler as part of a medium access control scheduler on a satellite includes selecting, from a plurality of user terminals, a first number of zero-bandwidth request user terminals from the plurality of user terminals, selecting, from the plurality of user terminals, a second number of non-zero-bandwidth request user terminals from the plurality of user terminals, binning the second number of non-zero-bandwidth request user terminals into a plurality of bins based on a respective bandwidth requirement for each non-zero-bandwidth request user terminal and based on a minimum user terminal grant and allocating, according to a grant allocation algorithm, a respective grant of radio resources in an uplink frame to each user terminal of the plurality of user terminals into a respective bin of the plurality of bins in an order associated with increasing bandwidth needs. A downlink scheduler is also disclosed.

23 Claims, 10 Drawing Sheets

(51) Int. Cl.
*H04W 72/1268* (2023.01)
*H04W 72/23* (2023.01)
*H04L 1/00* (2006.01)

(56) References Cited

U.S. PATENT DOCUMENTS

| | | | | |
|---|---|---|---|---|
| 9,591,639 | B2 * | 3/2017 | Zimmerman | H04W 72/0446 |
| 2002/0147011 | A1 * | 10/2002 | Kay | H04W 28/0289 |
| | | | | 455/12.1 |
| 2008/0298299 | A1 * | 12/2008 | Thesling | H04B 7/18582 |
| | | | | 370/316 |
| 2009/0010243 | A1 * | 1/2009 | Hiddink | H04W 74/04 |
| | | | | 370/346 |
| 2017/0238216 | A1 * | 8/2017 | Damnjanovic | H04W 16/28 |
| | | | | 455/427 |
| 2021/0075501 | A1 * | 3/2021 | Xu | H04B 7/1853 |

FOREIGN PATENT DOCUMENTS

| | | | | |
|---|---|---|---|---|
| EP | 2051455 A1 * | 4/2009 | | H04B 7/18584 |
| EP | 1764942 B1 | 11/2019 | | |
| WO | WO-2009151906 A2 * | 12/2009 | | H04W 52/0216 |

* cited by examiner

SYSTEM AND METHOD OF PROVIDING A MEDIUM ACCESS CONTROL SCHEDULER

PRIORITY CLAIM

The present application claims priority to Provisional Application No. 63/035,214, filed Jun. 5, 2020, the contents of which are incorporated herein by reference.

TECHNICAL FIELD

This disclosure introduces a medium access control (MAC) scheduler for satellite-to-user-terminal communications that takes into account factors such as propagation delays for the longer distance associated with satellite communication and the half-duplex nature of user terminal communication with the satellite. The MAC scheduler includes both an uplink scheduler and a downlink scheduler.

BACKGROUND

Satellite communication has advanced to enable direct communication between a single satellite and a number of different land-based user terminals. The framework is similar to a 4G or 5G cellular telephone system in which, for example, 10 cell phones can each communicate via wireless signals simultaneously with a base station. Each base station typically will have a geographic region that defines its "cell".

With satellite communication, there are some similar concepts. A satellite can communicate with, for example, 10 user terminals at the same time. Given the distances between a mobile user terminal on earth and a satellite in space, there are propagation delays that impact the timing and ability of multiple user terminals to be able to communicate effectively and efficiently with a satellite.

BRIEF DESCRIPTION OF THE DRAWINGS

In order to describe the manner in which the various advantages and features of the disclosure can be obtained, a more particular description of the principles described above will be rendered by reference to specific embodiments thereof, which are illustrated in the appended drawings. Understanding that these drawings depict only example embodiments of the disclosure and are not to be considered to limit its scope, the principles herein are described and explained with additional specificity and detail through the use of the drawings in which.

DETAILED DESCRIPTION

Figure 1:
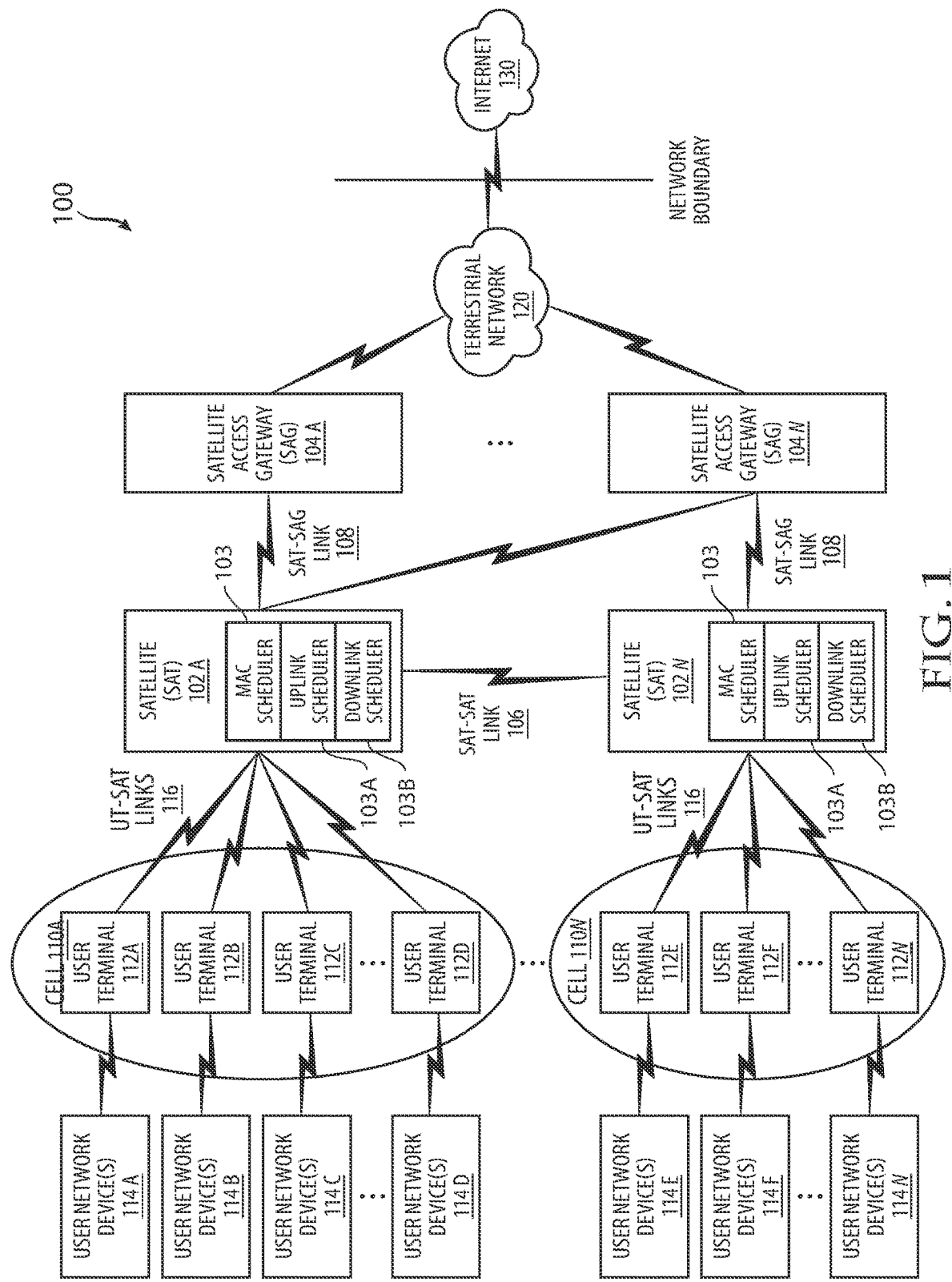
FIG. 1 is a simplified block diagram illustrating an example wireless communication system, in accordance with some examples of the present disclosure.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Overview

The present disclosure introduces a new medium access control (MAC) scheduler operating on a satellite that includes two components. Improvements are needed for managing the flow of data between multiple user terminals and a satellite given the distances involved as introduced above. An uplink scheduler can generate an uplink map that defines, for a group of user terminals on earth, which portions of an uplink radio frame can be used to transmit data to the satellite. In one example, four user terminals can each include data in the uplink radio frame. The MAC scheduler also includes a downlink scheduler that is used to generate a downlink map that defines portions of a downlink radio frame that are allocated to individual user terminals. The uplink scheduler has some differences relative to the downlink scheduler given some of the differences in the framework, such as the fact that multiple user terminals each send their respective data on the uplink radio frame and on the downlink, the satellite broadcasts the downlink radio frame to all the user terminals in a group and they each retrieve their respective data from the downlink radio frame. Other differences exist as well such as, in one example, the bandwidth of the uplink radio frame is approximately 62.5 MHz while the downlink radio frame bandwidth is approximately 250 MHz. Other differences include that the user terminals are operating in half-duplex mode where they either transmit or receive data but not both at the same time while the satellite operates in full-duplex mode in which it can receive and transmit data at the same time. The different protocols described herein take these factors and other factors into account.

A communication protocol defines a radio frame every 1.3 milliseconds and allocates the respective user data from a group of user terminals into the radio frame. The radio frame is defined by a band of frequencies on one axis and time on another. For example, 4 user terminals can each have a respective allocation of a portion of a radio frame in terms of frequency and time for data transmission on an uplink from each user terminal to the satellite. User terminals in satellite communication can also be defined by geographic cells or sectors as well, which can impact how the user terminals are grouped. A MAC scheduler can be configured on the satellite that will organize the various user terminals to properly share the resources of each radio frame on the uplink or downlink. The scheduler provides a "grant" of radio resources in the uplink radio frame for each user terminal. There is also a grant from the scheduler of radio resources on the downlink from the satellite to multiple user terminals as well. In this manner, multiple user terminals can achieve wireless access to a satellite. The satellite can then communicate on a peer-to-peer basis with a ground-based gateway system which connects to a network like the Internet. This network configuration enables user terminals with access to the Internet through the satellite and the gateway.

Disclosed are various approaches to providing a medium access control (MAC) scheduler with improved algorithms for scheduling data both on the uplink and on the downlink between a satellite and a user terminal or a gateway. Given scheduler constraints, uplink constraints and downlink constraints, this disclosure introduces an uplink scheduler algorithm, a grant allocation algorithm for the uplink, a downlink scheduler algorithm and a downlink grant allocation algorithm. These are all algorithms that can be used as part of the MAC scheduler.

This disclosure first introduces an uplink scheduling algorithm with a grant allocation algorithm in general terms. These algorithms generate an uplink map that is transmitted or broadcast to each user terminal in a group of user terminals such that each respective user terminal identifies its allocated or granted radio resources in an uplink frame for transmitting user data to the satellite.

A method of operating an uplink scheduler as part of a medium access control scheduler on a satellite can include one or more of the following steps in any order: selecting, from a plurality of user terminals, a first number of zero-bandwidth request user terminals from the plurality of user terminals, selecting, from the plurality of user terminals, a second number of non-zero-bandwidth request user terminals from the plurality of user terminals, binning the second number of non-zero-bandwidth request user terminals into a plurality of bins based on a respective bandwidth requirement for each non-zero-bandwidth request user terminal and based on a minimum user terminal grant and allocating, according to a grant allocation algorithm, a respective grant of radio resources in an uplink frame to each user terminal of the plurality of user terminals into a respective bin of the plurality of bins in an order associated with increasing bandwidth needs.

The method can further include generating, based on the allocating step, an uplink map which identifies the respective grant of radio resources in the uplink frame to each user terminal of the plurality of user terminals and broadcasting, from the satellite, the uplink map to the plurality of user terminals.

The grant allocation algorithm that is associated with the uplink scheduler can include one or more of the following steps: (1) forming the plurality of user terminals into bursts or the data to be transmitted by the user terminals into bursts, (2) computing an available burst length for each burst of the bursts, and (3) allocating the respective grant of radio resources to each respective user terminal of the plurality of user terminals for a respective burst of the bursts. The allocating step can be achieved by performing operations including (a) determining a total number of modulation symbols required for all user terminals having data in the respective burst of the bursts, (b) determining a number of required resource blocks for the respective burst of the bursts, (c) determining a required burst length for the respective burst of the bursts and (d) determining an unused burst length for the respective burst of the bursts, to yield the respective grant of radio resources to each respective user terminal to the respective burst of the bursts. The grant allocation algorithm can further include steps of (4) determining an update of how many available symbols exist and (5) repeating step (2) to step (4) until all the bursts are allocated.

A method of operating a downlink scheduler on a satellite can include one or more of the following steps occurring in any order: selecting a number of non-zero buffer occupancy user terminal/service-flow-identification (SFID) pairs in a round robin fashion from a plurality of user terminals to yield a set of user terminals, binning each user terminal of the set of user terminals into a plurality of bins based on a respective bandwidth requirement for each user terminal and based on a minimum user terminal grant, allocating, according to a grant allocation algorithm, a respective grant of radio resources in a downlink frame to each user terminal of the set of user terminals into a respective bin of the plurality of bins in an order associated with increasing bandwidth needs, generating, based on the allocating, a downlink map which identifies the respective grant of radio resources in the downlink frame to each user terminal of the set of user terminals and applying the downlink map for data broadcast from the satellite to the set of user terminals.

The grant allocation algorithm referenced above for the downlink map can include one or more of the following steps: (1) computing a user terminal grant based on an available modulation symbol value divided by a number of user terminals; (2) adding an unused modulation symbol to the user terminal grant to yield an unused user terminal grant; (3) obtaining the unused user terminal grant after packing service data units (SDUs); (4) calculating a number of unused code words and residual code word modulation symbols from the unused user terminal grant; (5) updating an available OFDM (orthogonal frequency division multiplexing) symbol value to be: available_ofdm_symb−(the user terminal grant−(unused_code_words*mod_symb_per_code_word)); (6) updating the unused modulation symbol to be equal to the unused modulation symbol plus a residual code word modulation symbol value; and (7) repeating step (1) to step (5) until all of the number of the non-zero buffer occupancy user terminal/SFID pairs are allocated.

One or more of the steps described above can be performed in any order as well as the order provided herein.

Detailed Description

This disclosure now provides more detail regarding the uplink scheduler algorithm, the grant allocation algorithm for the uplink, the downlink scheduler algorithm and the downlink grant allocation algorithm. These various algorithms are designed in view of scheduler constrains, uplink constraints, downlink constraints and other factors related to satellite to user terminal communications.

Wireless communication systems can use OFDMA (orthogonal frequency divisional multiple access) to split a radio signal or channel into multiple sub-signals to allow the wireless communication system to receive multiple signals from different devices within a single radio frame or channel. For example, multiple devices can each be assigned one or more non-overlapping sets of contiguous time and frequency subcarriers (e.g., resource elements) that devices can use to transmit digital signals simultaneously without interference. However, since the digital signals are orthogonal, OFDMA schemes are generally sensitive to Doppler shift and frequency and time synchronization problems.

It is noted that OFDM (orthogonal frequency division multiplexing) can also apply to this disclosure. In OFDM, each user data is assigned a block of time over all the frequencies in the radio frame. However, the preferred structure for the frames disclosed herein is OFDMA.

Figure 2:
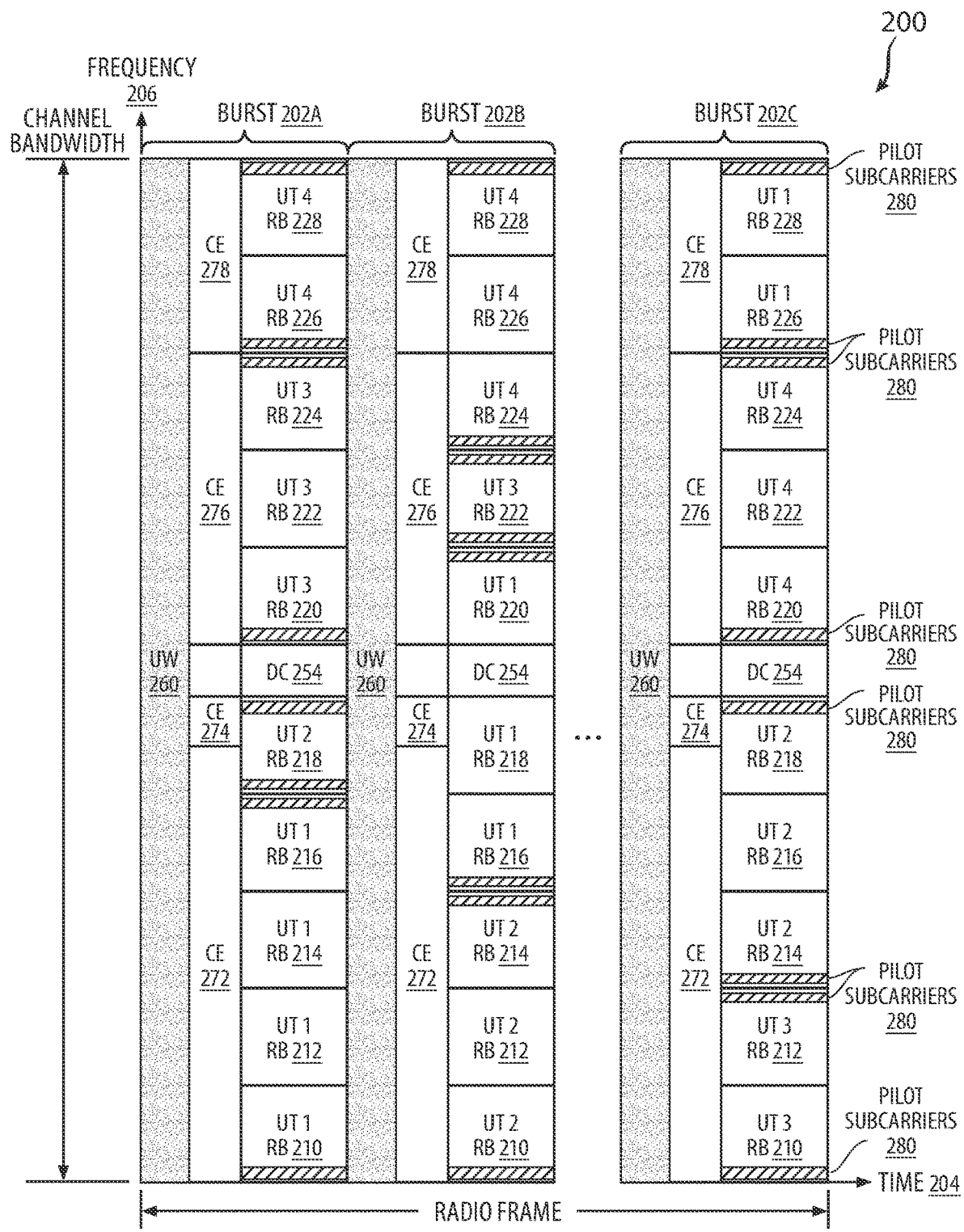
FIG. 2 illustrates a frame structure with different user data positioned in different locations with the frame.
Figure 3:
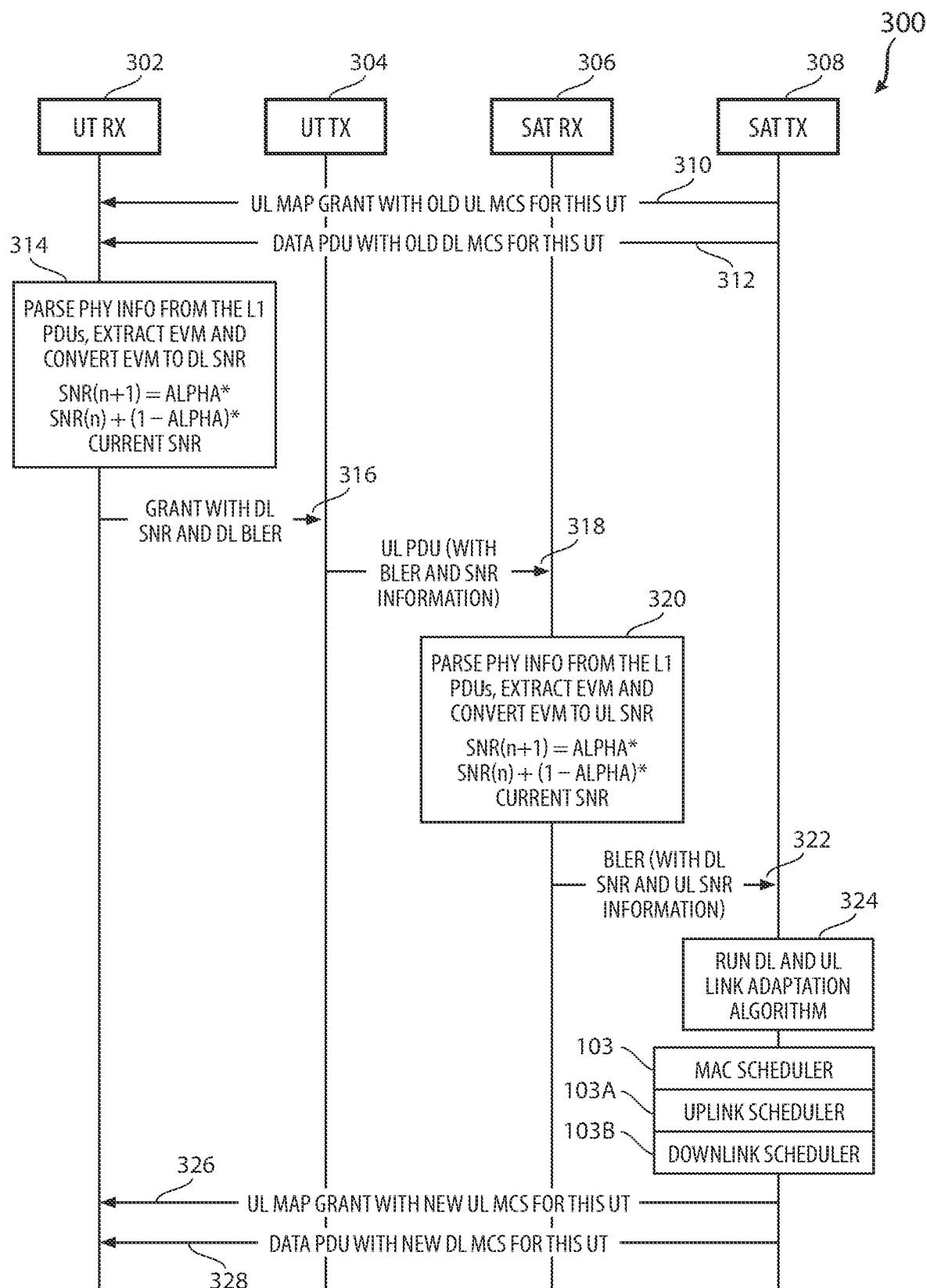
FIG. 3 is a diagram illustrating a signal flow between a satellite and a user terminal with respect to link adaptation.
Figure 4:
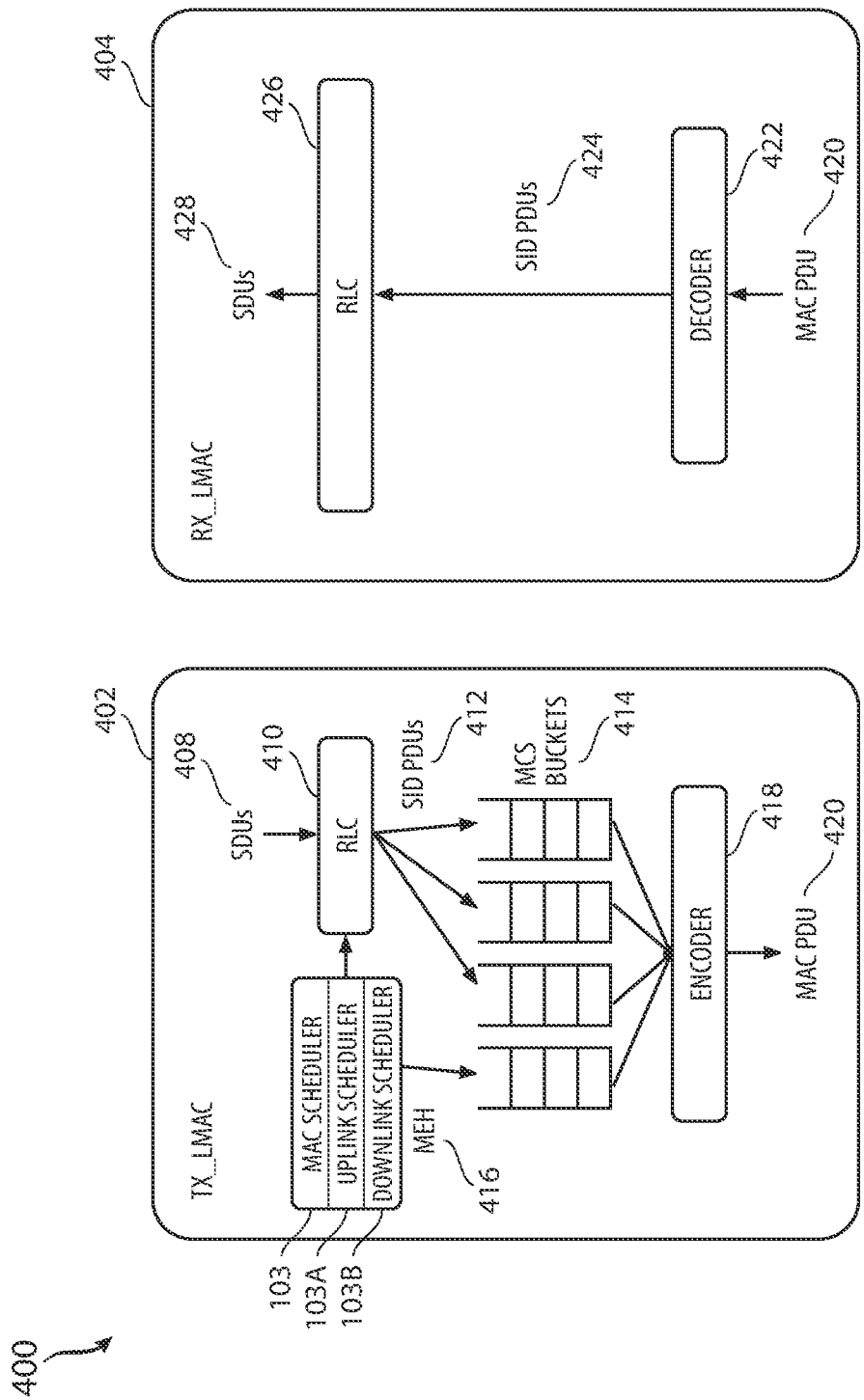
FIG. 4 illustrates a MAC scheduler as part of a satellite MAC software component.
Figure 6:
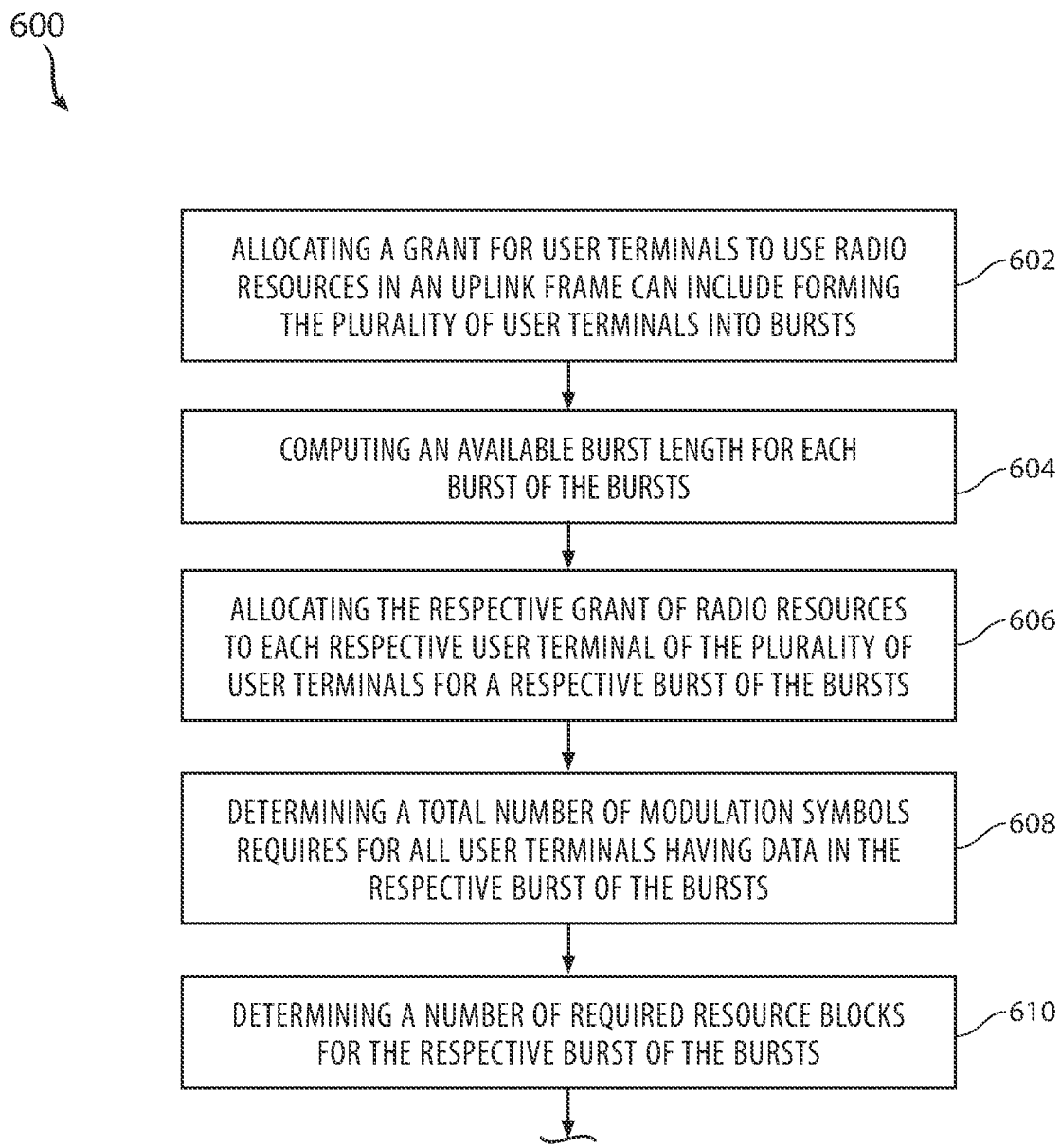
FIG. 6 illustrates a method embodiment for a grant allocation algorithm for the uplink.
Figure 6:
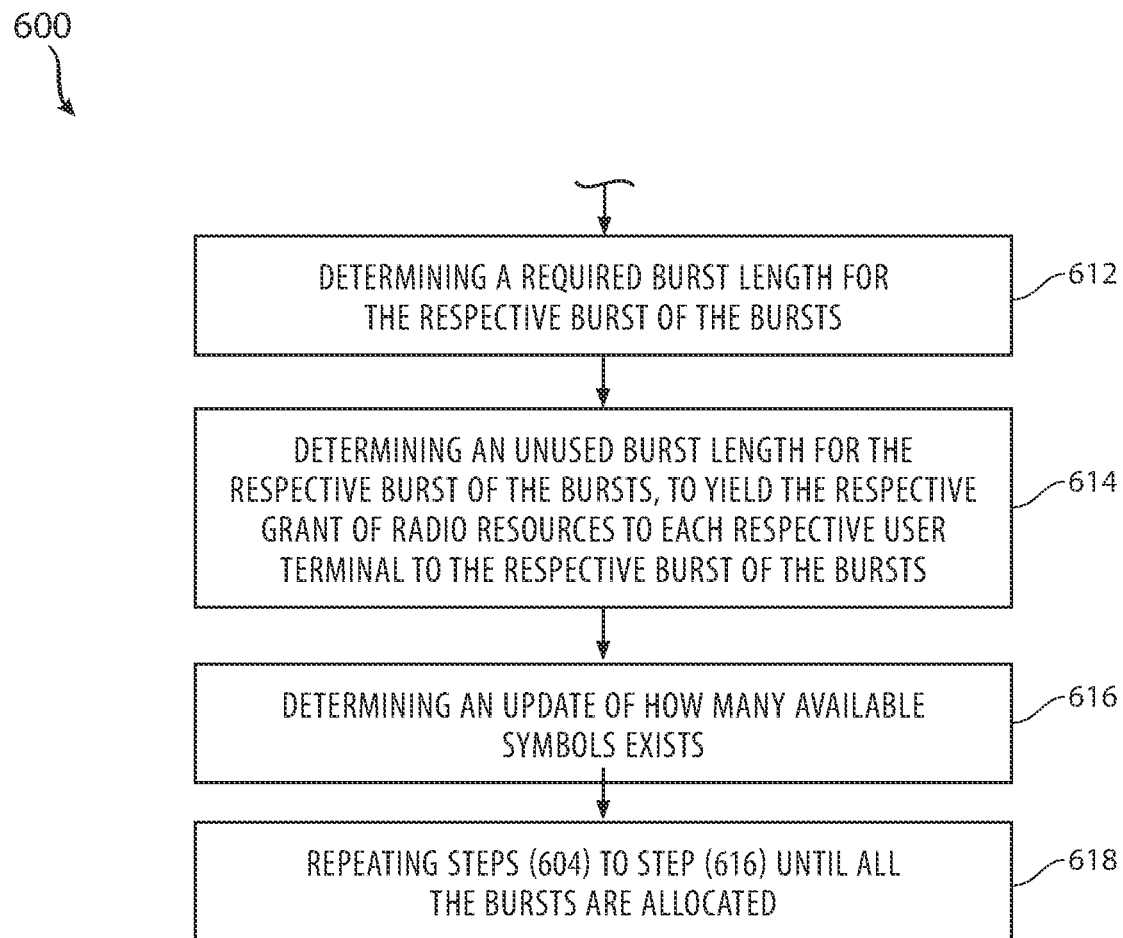
Figure 7:
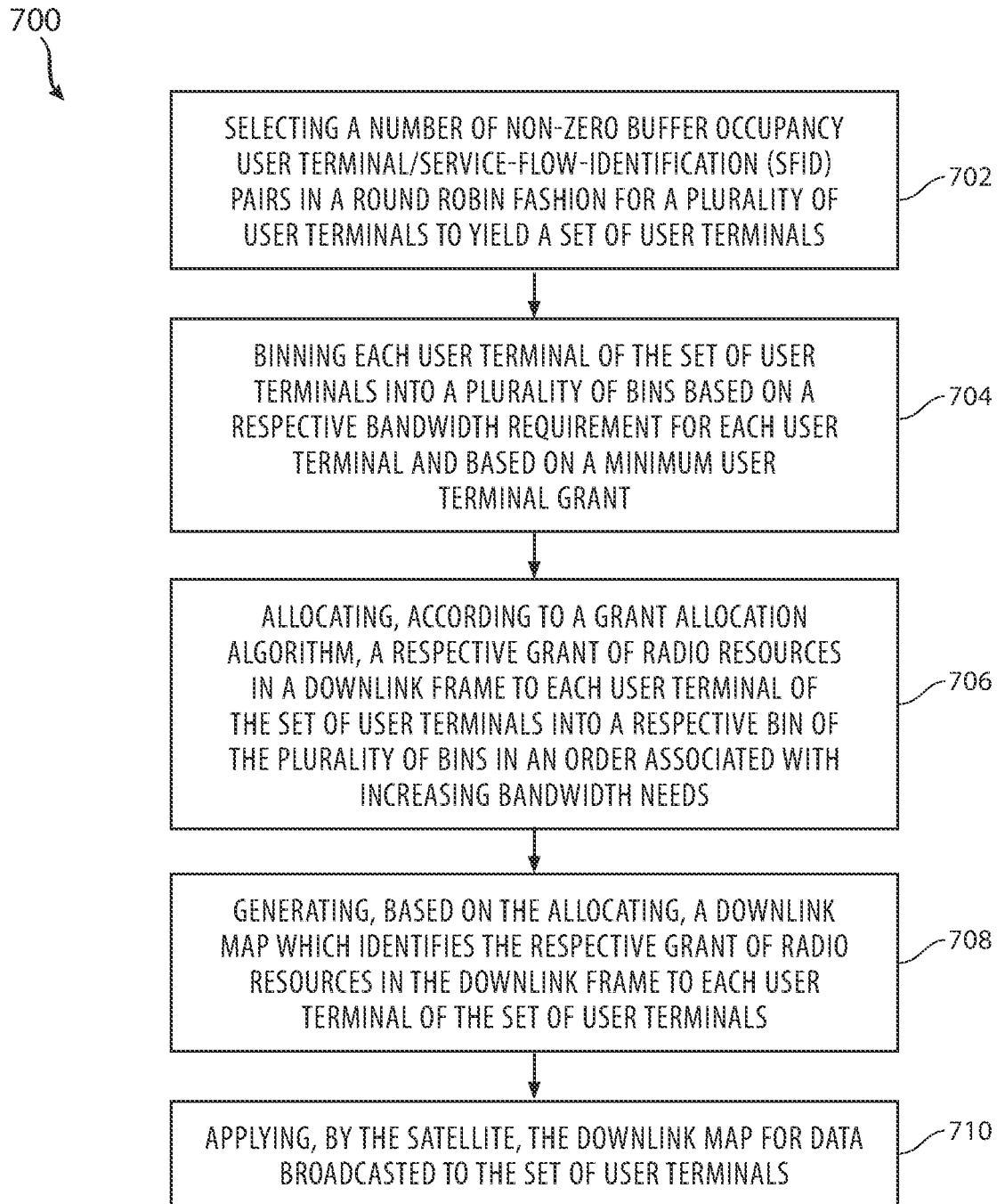
FIG. 7 illustrates a method embodiment for a scheduling algorithm for the downlink.
Figure 8:
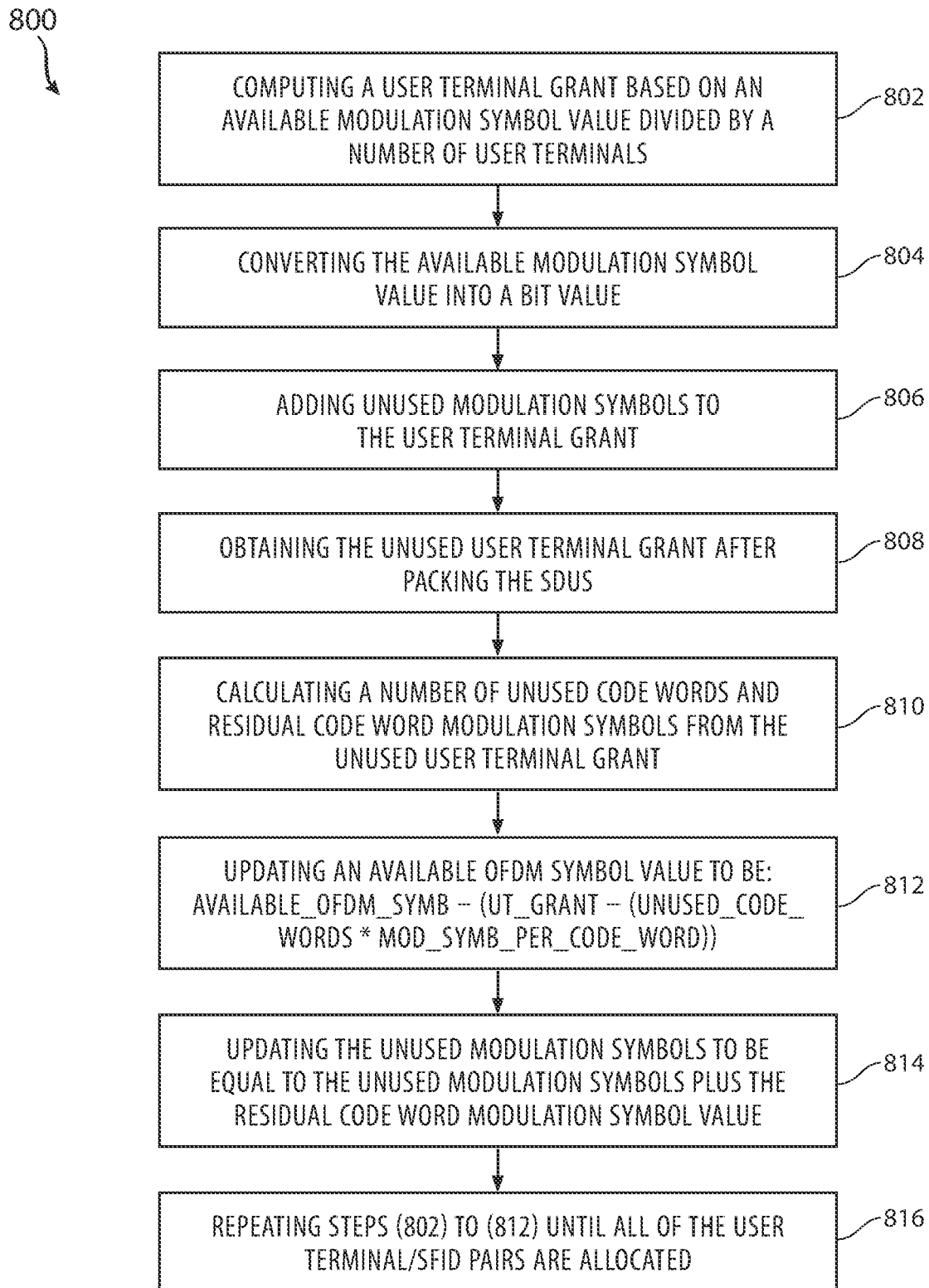
FIG. 8 illustrates a method embodiment for a grant allocation algorithm for the downlink.
Figure 9:
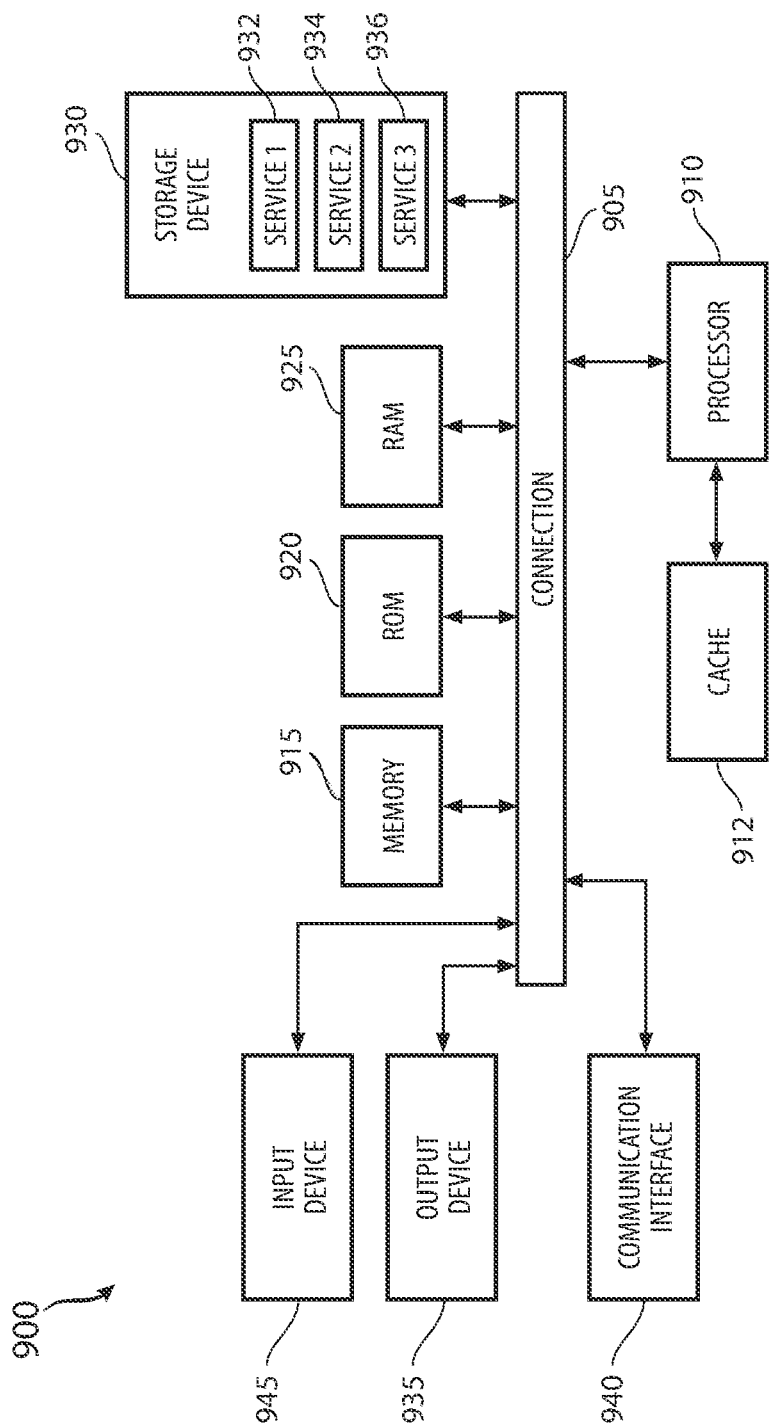
FIG. 9 illustrates an example computing device architecture, in accordance with some examples of the present disclosure.

The present technologies will be described in the following disclosure as follows. The discussion begins with a description of example systems and technologies for wireless communications and multi-user communication with a satellite, as illustrated in FIGS. 1 and 2. FIG. 3 illustrates the link adaptation algorithm on a satellite-user-terminal link. FIG. 4 illustrates the MAC scheduler and its operation relative to other components in a transmission LMAC (lightweight media access control) layer on a satellite. FIGS. 6-8 illustrate various method embodiments for an uplink scheduler and a downlink scheduler and their respective grand allocation algorithms. FIG. 9 illustrates basic computer components that can be used by any device disclosed herein. The disclosure now turns to FIG. 1.

FIG. 1 is a block diagram illustrating an example wireless communication system 100, in accordance with some examples of the present disclosure. In this example, the wireless communication system 100 includes one or more satellites (SATs) 102A through 102N (collectively "102"), one or more satellite access gateways (SAGs) 104A through 104N (collectively "104"), user terminals (UTs) 112A through 112N (collectively "112"), user network devices 114A through 114N (collectively "114"), and a terrestrial network 120 in communication with the Internet 130. As noted above, this disclosure provides different link adaptation algorithms for satellite-to-user-terminal communications as well as satellite-to-gateway communications.

The SATs 102A-N can include orbital communications satellites capable of communicating with other wireless devices or networks (e.g., 104, 112, 114, 120, 130) via radio telecommunications signals. The SATs 102 can provide communication channels, such as radio frequency (RF) links (e.g., 106, 108, 116), between the SATs 102 and other wireless devices located at different locations on Earth and/or in orbit. In some examples, the SATs 102A-N can establish communication channels for Internet, radio, television, telephone, radio, military, and/or other applications.

The SATs 102 can each include a MAC scheduler 103 which can include several components such as an uplink scheduler 103A and a downlink scheduler 103B. The combined scheduling algorithms can be referenced as the MAC scheduler 103. The operation of the MAC scheduler 103 is described in more detail below.

The user terminals 112 can include any electronic devices and/or physical equipment that support RF communications to and from the SATs 102. Similarly, the SAGs 104 can include gateways or earth stations that support RF communications to and from the SATs 102. The user terminals 112 and the SAGs 104 can include antennas for wirelessly communicating with the SATs 102. The user terminals 112 and the SAGs 104 can also include satellite modems for modulating and demodulating radio waves used to communicate with the SATs 102. In some examples, the user terminals 112 and/or the SAGs 104 can include one or more server computers, routers, ground receivers, earth stations, computer equipment, antenna systems, and/or any suitable device or equipment. In some cases, the user terminals 112 and/or the SAGs 104 can perform phased-array beamforming and digital-processing to support highly directive, steered antenna beams that track the SATs 102. Moreover, the user terminals 112 and/or the SAGs 104 can use one or more frequency bands to communicate with the SATs 102, such as the Ku and/or Ka frequency bands. Other frequency bands can be used as well.

The user terminals 112 can be used to connect the user network devices 114 to the SATs 102 and ultimately the Internet 130. The SAGs 104 can be used to connect the terrestrial network 120 and the Internet 130 to the SATs 102. For example, the SAGs 104 can relay communications from the terrestrial network 120 and/or the Internet 130 to the SATs 102, and communications from the SATs 102 (e.g., communications originating from the user network devices 114, the user terminals 112, or the SATs 102) to the terrestrial network 120 and/or the Internet 130.

The user network devices 114 can include any electronic devices with networking capabilities and/or any combination of electronic devices such as a computer network. For example, the user network devices 114 can include routers, network modems, switches, access points, laptop computers, servers, tablet computers, set-top boxes, Internet-of-Things (IoT) devices, smart wearable devices (e.g., head-mounted displays (HMDs), smart watches, etc.), gaming consoles, smart televisions, media streaming devices, autonomous vehicles, robotic devices, user networks, etc. The terrestrial network 120 can include one or more networks and/or data centers. For example, the terrestrial network 120 can include a public cloud, a private cloud, a hybrid cloud, an enterprise network, a service provider network, an on-premises network, and/or any other network.

In some cases, the SATs 102 can establish RF links 116 between the SATs 102 and the user terminals 112. The RF links 116 can provide communication channels between the SATs 102 and the user terminals 112. In some examples, the user terminals 112 can be interconnected (e.g., via wired and/or wireless connections) with the user network devices 114A. Thus, the RF links 116 between the SATs 102 and the user terminals 112 can enable communications between the user network devices 114A and the SATs 102. In some examples, each SAT 102A through 102N can serve user terminals 112 distributed across one or more cells 110A through 110N (collectively "110"). The cells 110 can represent land areas served and/or covered by the SATs 102. For example, each cell can represent the satellite footprint of radio beams propagated by a SAT 102. In some cases, a SAT 102 can cover a single cell. In other cases, a SAT 102 can cover multiple cells. In some examples, a plurality of SATs 102 can be in operation simultaneously at any point in time (also referred to as a satellite constellation). Moreover, different SATs 102 can serve different cells and sets of user terminals 112.

The SATs 102 can also establish RF links 106 with each other to support inter-satellite communications. Moreover, the SATs 102 can establish RF links 108 with the SAGs 104. In some cases, the RF links 116 between the SATs 102 and the user terminals 112 and the RF links between the SATs 102 and the SAGs 104 can allow the SAGs 104 and the user terminals 112 to establish a communication channel between the user network devices 114, the terrestrial network 120 and ultimately the Internet 130. For example, the user terminals 112 can connect the user network devices 114 to the SATs 102 through the RF links 116 between the SATs 102 and the user terminals 112. The SAGs 104 can connect the SATs 102 to the terrestrial network 120, which can connect the SAGs to the Internet 130. Thus, the RF links 108 and 116, the SATs 102, the SAGs 104, the user terminals 112 and the terrestrial network 120 can allow the user network devices 114 to connect to the Internet 130.

In some examples, a user can initiate an Internet connection and/or communication through a user network device from the user network devices 114. The user network device 114 can have a network connection to a user terminal from the user terminals 112, which it can use to establish an uplink (UL) pathway to the Internet 130. The user terminal 112 can wirelessly communicate with a particular SAT from the SATs 102, and the particular SAT can wirelessly communicate with a particular SAG from the SAGs 104. The particular SAG can be in communication (e.g., wired and/or wireless) with the terrestrial network 120 and, by extension, the Internet 130. Thus, the particular SAG 104 can enable the Internet connection and/or communication from the user network device to the terrestrial network 120 and, by extension, the Internet 130.

In some cases, the particular SAT 102 and SAG 104 can be selected based on signal strength, line of sight, and the like. If a SAG 104 is not immediately available to receive communications from the particular SAT 102, the particular SAT 102 can be configured to communicate with another SAT 102. The second SAT 102 can in turn continue the communication pathway to a particular SAG 104. Once data from the Internet 130 is obtained for the user network device, the communication pathway can be reversed using the same or different SAT 102 and/or SAG 104 as used in the UL pathway. The pathways described herein for enabling a user terminal to access the Internet through a SAT 102 and SAG 104 can be chosen based on the adaptation algorithms disclosed herein.

In some examples, the RF links 106, 108, and 116 in the wireless communication system 100 can operate using orthogonal frequency division multiple access (OFDMA) via both time domain and frequency domain multiplexing. OFDM, also known as multicarrier modulation, transmits data over a bank of orthogonal subcarriers harmonically related by the fundamental carrier frequency. An example configuration of an OFDM radio frame that can be used for communications in the wireless communication system 100 is shown in FIG. 2 and described below with respect to FIG. 2. Moreover, in some cases, for computational efficiency, fast Fourier transforms (FFT) can be used for modulation and demodulation.

While the wireless communication system 100 is shown to include certain elements and components, one of ordinary skill will appreciate that the wireless communication system 100 can include more or fewer elements and components than those shown in FIG. 1. For example, the wireless communication system 100 can include, in some instances, networks, cellular towers, communication hops or pathways, network equipment, and/or other electronic devices that are not shown in FIG. 1.

FIG. 2 illustrates an example configuration of a multi-user (MU) uplink (UL) radio frame 200. In this example, the radio frame 200 includes an OFDM signal structure, symbols and characteristics along a time domain 204 and a frequency domain 206. The radio frame 200 includes multiple bursts 202A through 202N, and each burst is allocated to four different user terminals (e.g., UT 1, UT 2, UT 3, UT 4). Each of the user terminals is allocated contiguous radio bursts (RBs) and channel estimation (CE) symbols immediately adjacent to the allocated RBs. The RBs and CE symbols are allocated to the four user terminals along the time domain 204 and the frequency domain 206. A unique word OFDM symbol can optionally be included in a burst and can help the satellite detect a particular user or a particular burst.

For example, in burst 202A, RBs 210-216 and CE 272 are allocated to UT 1, RB 218 and CE 274 are allocated to UT 2, RBs 220-224 and CE 276 are allocated to UT 3, and RBs 226-228 and CE 278 are allocated to UT 4. In burst 202B, RBs 210-214 and CE 272 are allocated to UT 2, RBs 216-220 and CE 274 are allocated to UT 1, RB 222 and CE 276 are allocated to UT 3, and RBs 224-228 and CE 278 are allocated to UT 4. Finally, in burst 202N, RBs 210-212 and CE 272 are allocated to UT 3, RB 214-218 and CE 274 are allocated to UT 2, RBs 220-224 and CE 276 are allocated to UT 4, and RBs 226-228 and CE 278 are allocated to UT 1. Note that, as shown in FIG. 2, the allocations between user terminals from burst to burst can be flexible, which can allow for allocations from burst to burst to vary or remain the same.

In some cases, the number of RBs between user terminals can vary depending on the payload sizes for the different user terminals. Moreover, in some cases, a burst (e.g., 202A, 202B, 202/V) can include a different total number of RBs than those shown in FIG. 2. In some cases, if fewer than four user terminals are supported in a given burst, at least some RBs and adjacent CE symbol sections can be empty or otherwise denoted as empty or null.

Each of the bursts 202A-202N includes preamble and payload symbols. The preamble portion or block of a burst includes a unique word (UW) symbol 260 and a CE portion including CE symbols 272-278. The UW symbol 260 can be used for burst detection, symbol alignment, carrier frequency offset estimation, etc. The CE symbols 272-278 can provide a preview of channel characteristics for use in channel estimation and equalization. These characteristics can be used by the MAC scheduler (103, 103A, 103B in FIG. 3) to make scheduling decisions. The payload symbols of a burst (also referred to as data symbols) can be located within a payload portion/block of the burst corresponding to the RBs 210-228.

The CE portion/block containing the CE symbols 272-278 of a burst can be located between the unique word portion/block (e.g., the UW symbol 260) and the payload portion/block (e.g., RBs 210-228) along the time domain 204. In other words, in the time domain 204, the unique word symbol 260 occurs first, followed by the CE symbols 272-278, and then followed by the RBs 210-228.

An OFDM signal allows certain subcarriers to be inactivated, and a configurable number of subcarriers can be disabled in order to avoid the region of spectrum around DC (also referred to as the DC, center, null, or zero subcarrier region) and/or disproportionately higher interference. Accordingly, in some examples, the radio frame 200 can include an unused DC subcarrier 254, which can coincide with the carrier center frequency.

Pilot subcarriers 280 can be used to provide and track amplitude, timing, and phase changes throughout a burst. Each of the bursts 202A-N can have pilot subcarriers 280 defined for the burst. The pilot subcarriers 280 can each be offset from the band edges by a specified number of subcarriers. FIG. 2 shows pilot subcarriers 280 at the edges of the first and last RB allocated to each user terminal. In some examples, the size of the pilot sub-bands and the offset from the band edges can be configurable. In some examples, for wide channel bandwidths, the information provided within pilot subcarriers for a given radio frame can be the same or can differ from each other.

This disclosure now turns to the MAC scheduler algorithms and the particular uplink scheduler and downlink scheduler configured with the MAC scheduler. The disclosure will introduce a number of different algorithms with variations.

The constraints that place a role in the MAC scheduler are discussed next. First, the MAC scheduler is preferably configured on a satellite. However, in other aspects, the MAC scheduler can be configured on other devices within the overall network. The MAC scheduler can take into account the propagation delays inherent in satellite communications. The MAC scheduler will, for example, take into account propagation delays having a minimum of 3.8 ms and a maximum of 5.4 ms, inclusive, when making scheduling decisions. Other ranges can be considered as well. The MAC scheduler can select a particular propagation delay based on data such as a distance between the user terminal and the satellite, a speed of the user terminal and/or the satellite, a direction vector associated with the user terminal or satellite, a distance between different user terminals in a group of user terminals, or any other factors.

The user terminals 112 in the framework described herein are considered to be operating in a half-duplex mode. A user terminal operating in half-duplex mode can either transmit or receive data at any given time. Such a user terminal does not both transmit and receive simultaneously. A full-duplex device can both transmit and receive data at the same time. While this disclosure is broad enough to encompass the use of full-duplex user terminals, the present disclosure is described with respect to user terminals that are operating in a half-duplex mode. One of the challenges is that the satellite 102 preferably operates in full-duplex mode, thus sending and receiving data simultaneously. Since the two devices communicating with each other operate in different modes, improved MAC scheduling techniques are needed to accommodate such differences.

Another constraint that the MAC scheduler can take into account is the power saving algorithms used by the user terminals 112 and/or the satellite 102. For example, the user terminal 112 may receive one in three radio frames. The user terminal 112 may be grouped into groups of three user terminals 112 that coordinate access to downlink radio frames. The user terminals 112 may implement a duty cycle for transmission which limits how much time each respective user terminal 112 can transmit over a given time frame such that it does not exceed a threshold limit. The power saving approaches can vary beyond what is described above. The general point is that the MAC scheduler can take such power saving schemes into account when applying a respective scheduling algorithm. Thus, if a user terminal has run out of or is nearly out of their allocated duty cycle, the scheduler may shift their data transmission or use of radio resources to a new time frame which maintains compliance with the duty cycle requirements.

Other considerations that are constraints for the MAC scheduler can include one or more of a user terminal capability, a maximum burst length constraint on a user terminal transmission component, user priority, data priority, quality of service requirements, or any other considerations.

The uplink scheduling algorithm can also have constraints. These constraints can relate to the structure of the radio frames. For example, a radio frame length in time might be fixed at 1.5 ms or 1.3 ms. In another aspect, the radio frame length in time might be variable or configurable and a scheduling algorithm should take into account the proper radio frame length that is being scheduled. An OFDM symbol length for a radio frame length of 1.5 ms can be approximately 17.3 us which can correspond with approximately 86 OFDM symbols, which number is a function of the radio frame length, in the time domain. In another example, if the radio frame length is 1.3 ms, then there might be approximately 74 OFDM symbols available in the time domain. Depending on the radio frame length, there can be, for example, 20 resource blocks for a frame length of 1.5 ms or 16 resource blocks when the radio frame length is 1.3 ms. The scheduling algorithm takes this data into account when allocating radio resources in a frame. All these values are provided by way of example only and other time frames can be used as well.

The various values described above depend on the structure of the radio frame length. Such data and the number of available OFDM symbols will be used by the various scheduler when making grant decisions on the uplink and in the frequency domain. Each channel can have a bandwidth of 60 MHz with, for example, 63 subcarriers or modulation symbols per resource block. The overall bandwidth for an uplink channel can be 62.5 MHz which includes a 60 MHz channel plus a guard band. The scheduler can schedule "bursts" of data in which a burst can include data for up to four user terminals 112. In one aspect, all of the user terminals of a burst can have the same allocation symbol duration. In another aspect, the user terminals 112 of a burst do not need to have the same allocation symbol duration. A preferable number of user terminals per uplink radio frame is four but of course that number can vary to be less than or more than four user terminals 112.

Downlink constraints also can be taken into consideration by the MAC scheduler. The downlink channel does not have "bursts" like the uplink channel does. In the downlink, the radio frame length can be, for example, 1.5 ms or 1.3 ms, which can be fixed, variable, or configurable. An OFDM symbol length can be approximately 4.4 us which results in approximately 340 OFDM symbols in the time domain as a function of the radio frame length. The downlink can have a bandwidth of approximately 250 MHz. The satellite broadcasts the downlink radio frame to all the user terminals 112 within a group of user terminals. The respective data for each user terminal 112 of the four user terminals is retrieved by each respective user terminal. The group of user terminals therefore receives the MAC PDU (packet data unit) and each respective user terminal 112 identifies the portion of the MAC PDU that is addressed for them. Power savings can also play a role and can be achieved through grouping the user terminals in some manner. For example, grouping user terminals geographically near one another can provide some power savings as the MAC PDUs transmitted to that group can be localized rather than widespread.

FIG. 3 illustrates a MAC scheduler approach 300 for the satellite-to-user-terminal framework. The MAC scheduler 103 includes an uplink scheduler 103A and a downlink scheduler 103B for scheduling data on both the uplink and the downlink. FIG. 3 also disclosed a link adaptation algorithm which dynamically adjusts the modulation and coding scheme (MCS) for the uplink and the downlink. The chosen MCS scheme for both the uplink and the downlink can also play a role in how the MAC scheduler 103 grants access to radio frames for respective data to or from a user terminal 112. The MCS determines how many bits can be transmitted in any given symbol and thus can play a role in the MAC scheduler 103 decisions.

The flow of data shown in FIG. 3 is between the user terminal receive component 302, the user terminal transmit component 304, a satellite receive LMAC 306 and a satellite transmit component or satellite transmit LMAC 308. The satellite 306/308 operates in a full-duplex mode meaning that it is configured to both receive data at the satellite receive LMAC 306 and transmit data from the satellite transmit LMAC 308 at the same time. In contrast, the user terminal receive component 302 and the user terminal transmit component 304 operate in a half-duplex mode in which the user terminal only receives data or transmits data at any given time but not both.

The signal flow in FIG. 3 includes transmissions for both downlink adaptation and uplink adaptation. The downlink adaptation process can also be separately described from the uplink adaptation process. In one example, a calculation of the SNR 314 for the downlink adaptation process occurs on the user terminal receive component 302. In another example, a calculation of the SNR for the uplink adaptation process 320 occurs on the satellite. However, for all satellite-to-user-terminal link adaptation algorithms, the satellite runs the link adaptation algorithm to determine the new uplink MCS and the new downlink MCS.

For the downlink adaptation process, the satellite uses feedback from the user terminal about the link quality on the downlink. In a first step, the satellite transmit LMAC 308 transmits to the user terminal receive component 302 an uplink map grant with an old or previous uplink MCS for a particular user terminal 310. The satellite transmit LMAC 308 can transmit a data packet data unit according to an old or previous downlink MCS 312 for the particular user terminal 302. The satellite transmit LMAC 308, as the transmitter of data, needs to know or get feedback from the user terminal 302/304 about the quality of the downlink so that the satellite can adjust the downlink MCS accordingly. From the satellite's perspective, it can determine the uplink quality based on its analysis of the data received from the user terminal on the uplink channel 320. Thus, the satellite receives the downlink SNR and BLER (block error rate) from the user terminal 318, evaluates the uplink quality it is experiencing 320, and executes the link adaptation algorithm 324 based on at least some of the data 322.

As part of the downlink adaptation process, the user terminal receive component (which can be a modem) 302 parses information from the physical layer 1 of the OSI (Open Systems Interconnection) model packet data units to extract error vector magnitude (EVM) data and converts the data to a downlink signal-to-noise-ratio 314. The user terminal receive LMAC component 302 parses the physical information and sends SNR information to the transmission LMAC 316. An LMAC is a "lightweight" MAC protocol used for wireless communications where there are energy use issues such as on a satellite or mobile user terminal. An example calculation, performed by the user terminal, of the SNR can be as follows: SNR=alpha*prev_SNR+(1−alpha)*current_SNR 314. Alpha can represent a constant value. The EVM data can be passed through a PHY (physical) information data field in a header of an OSI layer 1 packet data unit. Grant data, the downlink SNR and downlink block error rate (BLER) data can be communicated 316 to the user terminal transmit LMAC component 304. The user terminal transmit LMAC component 304 can transmit an uplink packet data unit having the BLER and SNR information 318 (SNR feedback) to the satellite receive LMAC 306 when an uplink grant is available.

Both the BLER and the SNR feedback are provided because in some cases, the SNR value may be good, but the BLER is actually poor because of interference or other reasons. Accordingly, the algorithms disclosed herein can utilize the SNR data and/or the BLER to update the MCS dynamically according to the link adaptation algorithm 322.

The BLER data can provide good information, independent of SNR, regarding what the receiver 302 is actually seeing on the downlink.

The satellite receive LMAC 306 parses the PHY information from the layer 1 packet data units and extracts the EVM and converts the EVM to an uplink SNR 320. The calculation on the satellite can be as follows. SNR=alpha*prev_SNR+(1−alpha)*current_SNR. The alpha term can be a constant. The satellite receive LMAC 306 sends the user terminal SNR feedback and the BLER to the satellite transmit LMAC 308. The satellite transmit LMAC 308 can use the user terminal SNR feedback and/or the BLER to run the link adaptation algorithm 324 for downlink adaptation to generate a new downlink MCS. There is value in the adaptation algorithm 324 receiving the BLER, the downlink SNR and/or the uplink SNR in order to make a proper MCS decision. Including the BLER can cause a change in the MCS or not separate from the SNR data. For example, if the SNR value is good, but the target BLER of the system is 10% and the actual BLER received is 13%, then the system will adapt the MCS based on the target BLER not meeting a threshold.

The satellite transmit LMAC 308 can transmit a second data packet data unit with a new downlink MCS for the user terminal 328. The satellite transmit LMAC 308 can use the user terminal SNR feedback to run the link adaptation algorithm 324 for uplink adaptation to generate a new uplink MCS transmission 326 to the user terminal 302 with an uplink map grant. The MAC scheduler 103, which is the focus of this disclosure, can use the uplink MCS and/or the downlink MCS as the basis at least in part to make grant decisions for both the uplink 326 and the downlink 328. The user terminal can then use the new uplink MCS and the map grant 326 for transmitting data packets on the uplink.

It is noted that the satellite transmit LMAC 308 in the example above determines both the uplink MCS and the downlink MCS. For the downlink MCS, the satellite transmits data to the user terminal 328 according to the new downlink MCS. The satellite transmit LMAC 308 also transmits instructions 326 for the user terminal for what MCS the user terminal should use for transmissions on the uplink.

It is noted that the SNR reports are not sent in every frame. The system can average the SNR over a number of frames as shown in the analysis represented by feature 320. The system can take an interval of values and average them to finalize the uplink SNR information which will be used by the link adaptation algorithm 324. In one example, the system can run the adaptation algorithm every X seconds, such as every 20 milliseconds. The timing of this can be set at any value and can also vary based on link channel conditions or other factors. In another example, the user terminal may run a calculation every X milliseconds, and the satellite might run a calculation or the algorithm every Y milliseconds, and the values of X and Y might be the same or be different.

The MAC scheduler 103 on the satellite 306/308 will invoke the link adaptation algorithm 324 such that the MCS can be chosen and transmitted to the user terminal 302/304 with a map grant for the uplink data from the user terminal. The MAC scheduler 103, via the grant, allocates the radio resources to the user terminal 302/304 and other user terminals. The channel quality directly impacts the amount of resources the MAC scheduler 103 needs to allocate for a given user terminal. For example, if the channel quality is good, less radio resources are needed to communicate a certain amount of information. Conversely, if the channel quality is bad, then more radio resources are needed to transmit the same amount of data. Before allocating the radio resources, the MAC scheduler 103 will call the link adaptation algorithm 324 (which is provided with the SNR information (uplink/downlink SNR, BLER, etc.)), receive the new uplink and/or downlink MCS and then use the downlink MCS for communications on the downlink and transmit the uplink MCS to the user terminal so it can transmit on the uplink according to the new MCS.

The uplink scheduler 103A, as part of the MAC scheduler 103, includes an uplink scheduling algorithm and an uplink grant allocation algorithm with differences from the downlink scheduler 103B and downlink grant allocation algorithm. Inputs to the uplink scheduler 103A include bandwidth requests reported by a user terminal or requested from the user terminal through a bandwidth request MEH (multiplexing extended header). The SNR of the user terminal measured 320 at the satellite receive component or satellite receive LMAC 306 can be provided to the link adaptation algorithm 324 to determine the MCS and/or to the MAC scheduler 103 as well. In one aspect, the uplink SNR 320 determined at the satellite 306/308, when it is used to identify the MCS 324, is essentially provided to the MAC scheduler 103 by virtue of the chosen MCS.

In another aspect, the downlink SNR experienced or calculated at the user terminal 302/304 can also be provided to the MAC scheduler 103 as well. Another input to the uplink scheduler 103A is a number of user terminals to be scheduled in a radio frame. A preferred number is four user terminals or data for four user terminals to be configured in a radio frame. However, other numbers can be used as well such that the number of user terminals can be above four or below four. In one example, when the MAC scheduler 103 schedules a burst, the data for a maximum of four user terminals can be used.

Yet another value utilized by the MAC scheduler 103 can be the number of user terminals with a zero total bandwidth request. This data can be used by the uplink scheduler 103A to give a minimum grant for these user terminals that have a zero bandwidth request. Therefore, a small amount of radio resources is granted to a user terminal even if that terminal has a zero total bandwidth request. A user terminal that does not communicate anything to the satellite might be a zero bandwidth request user terminal or in another scenario a user terminal can specifically communicate to the satellite that it has zero bandwidth needs. Note that on the downlink scheduler 103B, user terminals with a zero bandwidth request are simply ignored.

Another value provided to the MAC scheduler 103 is a number of groups into which a plurality of user terminals is grouped into and the number of user terminals in each group. It is assumed for purposes of this disclosure that a separate component performs a grouping of user terminals and provides the grouping data to the MAC scheduler 103.

In channel estimation, OFDM symbols (272, 274, 276, 278), unique word OFDM symbols 260 and pilots per OFDM 280 can also be considered in the calculations disclosed herein. Any one or more of these parameters can be included in or be used as a basis for a scheduling decision or grant allocation.

When a user terminal first communicates with the satellite, the process is called a user terminal satellite network entry. Generally, the user terminal satellite network entry process is random access when the user terminal first communicates with the satellite seeking entry into the network. Ultimately, after being granted access to the network, a user terminal is placed in a group. In one scenario, a user terminal trying to enter the network can have a priority over users already within the network and who are receiving or transmitting data. Once the groups of user terminals are established, the MAC scheduler 103 can then proceed to allocate user terminals in the various groups to radio resources.

FIG. 4 illustrates the integration of the RLC (radio link control) protocol 400 within a MAC software component or TX_LMAC (transmission lightweight medium access protocol component) 402. The RLC protocol 400 relates to an adaptive acknowledged mode for the TX_LMAC 402 which is managed by an RLC sublayer 410 to the MAC protocol layer represented by feature 402. Generally, the RLC sublayer 410 varies between an acknowledged mode where packets are acknowledged as received or in an unacknowledged mode in which packets are not acknowledged as received.

The TX_LMAC 402 receives SDUs (service data units) 408 at the RLC sublayer 410. A MAC scheduler 103 communicates instructions data to the RLC sublayer 410 and MEH data 416 to MCS (modulation and coding scheme) buckets 414. The MAC scheduler 103 can include an uplink scheduler 103A and a downlink scheduler 103B. The RLC sublayer 410 receives grants for each SID/SFID pair from the MAC scheduler 103 as described herein. The MAC scheduler 103, via the grant, allocates the radio resources to the user terminal 404 and other user terminals (not shown). A particular user terminal 404 can be granted a portion of a radio frame on an uplink channel for communication of data to a satellite. The radio frame can also be shared with other user terminals with their respective grants of a portion of the frame for their data. The channel quality directly impacts the amount of resources the MAC scheduler 103 needs to allocate for a given user terminal 404. For example, if the channel quality is good, less radio resources are needed to communicate a certain amount of information. Conversely, if the channel quality is bad, then more radio resources are needed to transmit the same amount of data.

The RLC sublayer 410 takes the SID/SFID pair and maps it to the RLC flow, takes the grant from the MAC scheduler 103 and generates a RLC PDU (not shown) containing the RLC header and the required SDUs, fragmenting as necessary to fulfill the grant. The RLC sublayer 410 then aggregates the RLC PDUs into a SID PDU 412. The RLC sublayer 410 will produce SID PDUs 412 that are placed into the appropriate MCS buckets 414. An encoder 418 then will encode the data and generate the MAC PDU 420 to the transmitted over the air interface to a respective user terminal 404. The MAC PDU 420 is included within a downlink radio frame broadcast to a number of different user terminals with instructions to enable each respective user terminal 404 to identify and extract its data from the downlink radio frame.

An RX LMAC (receiver transmission lightweight medium access protocol component) component of the user terminal 404 can receive the MAC PDUs 420 and decode them using the decoder 422 into SID PDUs 424. The RLC sublayer 426 receives the SID PDUs 424 and further decomposes them into SDUs 428, reassembling fragmented SDUs as necessary, and delivers the SDUs to a layer 3 (not shown) of the user terminal 404. The TX_LMAC 402 can be, for example, configured as part of the satellite transmission unit 308 or as part of a transmission unit in the user terminal 304 in FIG. 3.

Figure 5:
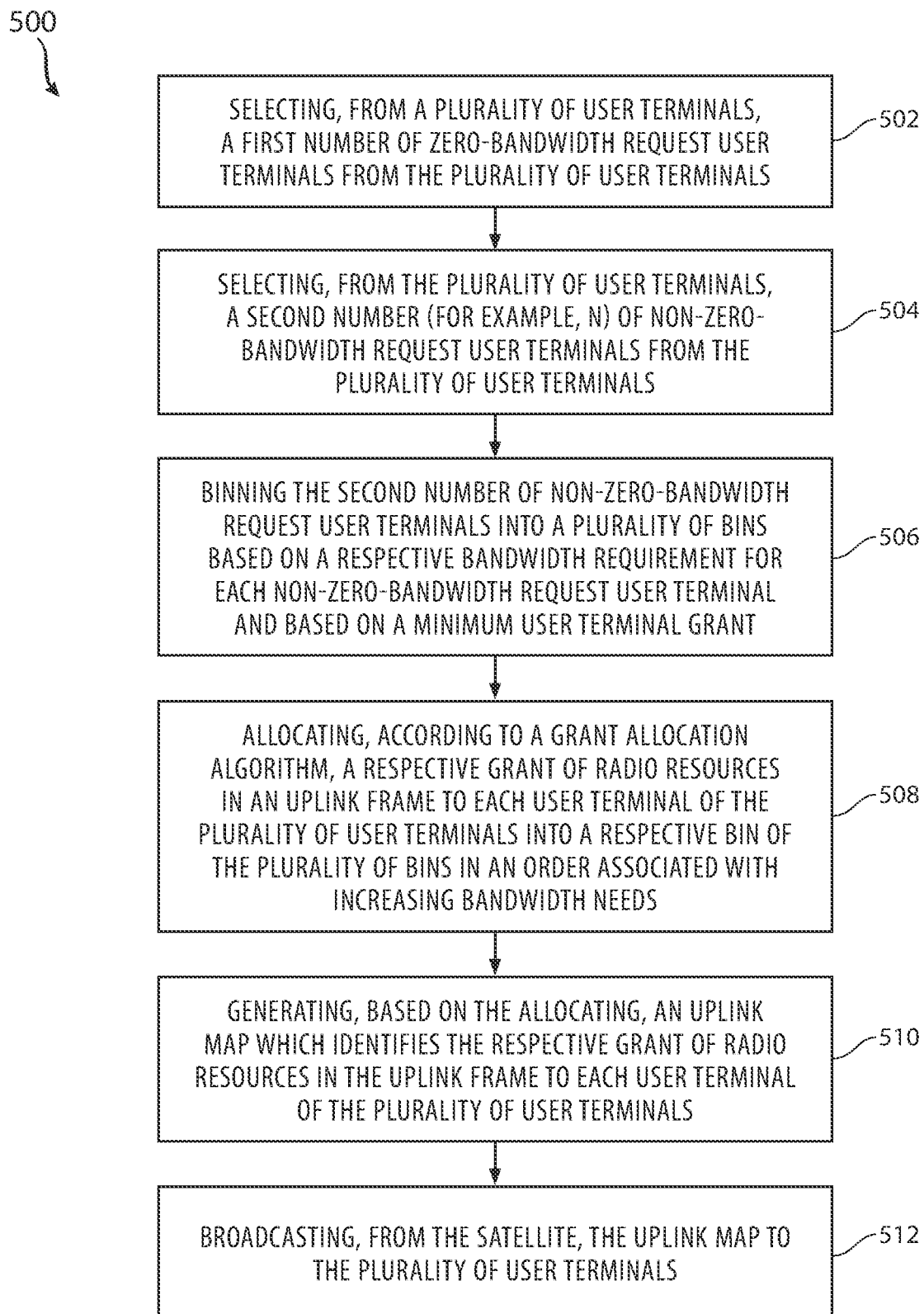
FIG. 5 illustrates a method embodiment for a scheduling algorithm for the uplink.

FIG. 5 illustrates a method 500 example for a scheduling algorithm on an uplink. The method can operate in a round robin fashion as opposed to a random access method used by Wi-Fi access points. The random access approach can also apply in some instances to satellite communications as disclosed herein as well.

Since the user terminals operate in a half-duplex mode as discussed above, the MAC scheduler 103 will group user terminals into scheduling groups. For example, if there are 16 users, the system may create a first grouping of 8, a second grouping of 4 and a third grouping of 4. These groups can be generated based on different factors but generally the system will group user terminals based on geography and how close together the user terminals are. In another aspect, the MAC scheduler 103 will receive data on the groupings and run the scheduling algorithm according to the groupings and in a round robin fashion for each group of user terminals. User terminals in each group can be zero bandwidth request user terminals, non-zero bandwidth request user terminals or user terminals seeking access to the satellite network through a random access approach. Typically, user terminals seeking access to the satellite network will be given priority to enable them to enter the network and then have grants of access to radio resources with the other user terminals registered with the satellite network.

The MAC scheduler 103 seeks to establish as efficiently as possible the allocation of user terminal data into a radio frame (both on the uplink and on the downlink) given the various constraints described herein. The MAC scheduler 103 executes a process for each group of a plurality of groups of user terminals and steps through, for each group, in a round robin fashion, allocating grants of radio resources for each respective user terminal. Other grant allocations different from a round robin fashion can occur as well, such as based on user priority, quality of service requirements and so forth.

An example scheduling algorithm is disclosed in FIG. 5. A corresponding grant allocation algorithm for the uplink is shown in FIG. 6. A method 500 of operating an uplink scheduler 103A on a satellite can include one or more of the following steps in any order. The method can include selecting, from a plurality of user terminals, a first number of zero-bandwidth request user terminals from the plurality of user terminals (502). This selection can be from a grouping of user terminals based on geography or based on other factors used to organize the terminals into groups. The algorithm can apply to different groupings of user terminals and the plurality of user terminals can either refer to a group of user terminals or all the terminals in a set of groups of user terminals. For any group of user terminals, the selecting of a first number (for example, M zero-bandwidth request user terminals) can be performed in a round robin method (or other method) and can include setting the allocation required as the minimum number of modulation symbols needed, or MIN_NUM_MOD_SYMB. The first number M can be configurable and can also be dynamic and set in order to schedule as many user terminals as possible during a beam switch operation.

The method can further include selecting, from the plurality of user terminals, a second number (for example, N) of non-zero-bandwidth request user terminals from the plurality of user terminals (504). Step (504) can include calculating a required number of modulation symbols for each user terminal of the N user terminals in order to empty the buffers containing data to transmit. The method can further include binning the second number of non-zero-bandwidth request user terminals into a plurality of bins based on a respective bandwidth requirement for each non-zero-bandwidth request user terminal and based on a minimum user terminal grant (506). The concept of "binning" is similar to a grouping concept but the term "binning" is used to differentiate the organization of the non-zero-bandwidth request user terminals into bandwidth requirement bins from the grouping process which initially occurs to group user terminals based on geography or other factors.

The respective bandwidth requirement for a respective user terminal can be calculated as a number of required modulation symbols based on a number of code words times a number of symbols per code word plus a number of modulation symbols where the number of code words equals ceil div (total bandwidth required+MAC_MEH_MIN_SIZE, bitsper_code_word). The ceil div operation divides a/b (the values defined by ceil div(a,b) without performing any floating point operations. In this case, it would divide (total bandwidth required+MAC_MEH_MIN_SIZE) by the bitsper_code_word without any floating point operation. In other words, the number of code words is calculated based on a total bandwidth required for the respective user terminal, a minimum or maximum size reported in a medium access control multiplexing extended header, and a bits per codeword value.

The minimum user terminal grant can be calculated based on a minimum number of orthogonal frequency division multiplexing symbols (min_ofdm_symb), a number of frequency domain resource blocks (MAC_NUM_FREQ_DOMAIN_RB), an uplink maximum user terminals per burst (MAC_UL_MAX_UT_PER_BURST) and a number of sub carriers per resource block (MAC_NUM_SUB_CARRIERS_PER_RB). As a formula, the minimum user terminal grant is as follows:

min_ut_grant=
((min_ofdm_symb*MAC_NUM_FREQ_DOMAIN_RB)/
MAC UL_MAX_UT_PER_BURST)*MAC_
NUM_SUB_CARRIERS_PER_RB.

where
min_ofdm_symb=MAC_NUM_OFDM_SYMB/num_bursts
num_bursts=ceil_div(num_ut, MAC_UL_MAX_UT_PER_BURST)
num_ut=num_br_alloc_ut+num_non_zero-br_ut
MAC_UL_MAX_UT_PER_BURST=4.

It is noted that setting the MAC_UL_MAX_UT_PER_BURST at 4 provides some efficiencies in terms of central processing unit (CPU) usage. For example, if the system needed to pack 64 different users into a respective burst, then the calculations needed would dramatically increase. Keeping the number of users set to 4 reduces the CPU resources needed to run the MAC scheduler 103. Of course, other values besides 4 can work as well, such as 2, 8, 12 or any other number.

In one aspect, the plurality of bins includes one or more of a bandwidth request allocation bin for user terminals with zero-bandwidth requests, a low-bandwidth bin, a medium-bandwidth bin and a high-bandwidth bin. Binning the second number of non-zero-bandwidth request user terminals from the plurality of user terminals into one of the low-bandwidth bin, the medium-bandwidth bin and the high-bandwidth bin based on the respective bandwidth requirement for each non-zero-bandwidth request user terminal and based on a minimum user terminal grant further can include a number of options. If a respective non-zero-bandwidth request user terminal has a respective bandwidth requirement that is less than a minimum user terminal grant, then the method includes adding the respective non-zero-bandwidth request user terminal to the low-bandwidth bin, If the respective non-zero-bandwidth request user terminal has a respective bandwidth requirement that is greater than the minimum user terminal grant and less than two times the minimum user terminal grant, then the method can include adding the respective non-zero-bandwidth request user terminal to the medium-bandwidth bin. Otherwise, the method can include adding the respective non-zero-bandwidth request user terminal to the high-bandwidth bin.

There can also be less or more bins used as well. For example, the bins can include a low bandwidth bin and a high bandwidth bin. There can be different gradations of the bins which generally starting with lower bandwidth requirement bins and then using bins associated with increasingly more bandwidth requirements.

The method further can include allocating, according to a grant allocation algorithm, a respective grant of radio resources in an uplink frame to each user terminal of the plurality of user terminals into a respective bin of the plurality of bins in an order associated with increasing bandwidth needs (508) and generating, based on the allocating, an uplink map which identifies the respective grant of radio resources in the uplink frame to each user terminal of the plurality of user terminals (510). The method can include broadcasting, from the satellite, the uplink map to the plurality of user terminals (512).

The uplink map can include or identify the radio resources each user terminal gets in the uplink frame. A respective user terminal will determine from the uplink map when and how much of the radio resources it is allocated. The uplink map can include a number of frequency domain resources, when the frequency domain resources start for a respective user terminal, a number of time symbols, and what the starting time is in the frame for the respective user terminal. Generally, the uplink map is received by each user terminal in a group and the respective user terminal identifies exactly where in the uplink frame its allocated radio resources are such that the user terminal can transmit its data to the satellite according to the uplink map.

FIG. 6 illustrates the grant allocation algorithm 600 for the uplink scheduler 103A in more detail. A method 600 can include allocating a grant for user terminals to use radio resources in an uplink frame can include forming the plurality of user terminals into bursts (602), computing an available burst length for each burst of the bursts (604), and allocating the respective grant of radio resources to each respective user terminal of the plurality of user terminals for a respective burst of the bursts (606). The step of forming the plurality of user terminals into bursts can be limited to or subject to a MAC_UL_MAX_UT_PER_BURST value which identifies the maximum uplink per-user-terminal burst value.

The following operations can be used to allocate the respective grant and can be part of the step (606) above: determining a total number of modulation symbols required for all user terminals having data in the respective burst of the bursts (608), determining a number of required resource blocks for the respective burst of the bursts (610) and determining a required burst length for the respective burst of the bursts (612). The method can further include determining an unused burst length for the respective burst of the bursts, to yield the respective grant of radio resources to each respective user terminal to the respective burst of the bursts (614). The method then continues with determining an update of how many available symbols exists (616) and repeating steps (604) to step (614) until all the bursts are allocated (618).

In one aspect, the plurality of user terminals can include a set of groups of user terminals in which a first group of user terminals is allocated the respective grant of radio resources in the round robin fashion and thereafter a second group of user terminals is allocated the respective grant of radio resources in the round robin fashion.

The selecting, from a plurality of user terminals, of the first number of zero-bandwidth request user terminals from the plurality of user terminals and the selecting, from the plurality of user terminals, of the second number of non-zero-bandwidth request user terminals from the plurality of user terminals can both be done in a round robin fashion or in some other fashion such as based on user priority or other parameters.

In one aspect, the plurality of user terminals are grouped into different groups prior to the selecting, from a plurality of user terminals, of the first number of zero-bandwidth request user terminals from the plurality of user terminals and the selecting, from the plurality of user terminals, of the second number of non-zero-bandwidth request user terminals from the plurality of user terminals.

In another aspect, the plurality of bins and the order associated with increasing bandwidth needs include first, to a low-bandwidth bin for low-bandwidth user terminals from the second number of non-zero-bandwidth request user terminals, second, to a medium-bandwidth bin for medium-bandwidth user terminals from the second number of non-zero-bandwidth request user terminals and third, to a high-bandwidth bin for high-bandwidth user terminals from the second number of non-zero-bandwidth request user terminals.

In another aspect, the plurality of bins can include one or more of a bandwidth request allocation bin for user terminals with zero-bandwidth requests, a low-bandwidth bin, a medium-bandwidth bin and a high-bandwidth bin. Other bin definitions can be used as well such as a low bandwidth and a high bandwidth bin or more layers of bins such as four or more layers. Bins could also be allocated from largest to the smallest bandwidth requirements as well.

The scheduling described herein is performed generally on each satellite and is performed separately for each beam. For example, one satellite beam might service a certain geographic area with 4, 10 or 20 user terminals. The scheduling algorithms can be applicable separately for each beam that is in communication with one or more user terminals. The scheduling can also occur on a central controller remote from the satellite.

FIG. 7 illustrates and example method 700 related to a downlink scheduler 103B as part of the MAC scheduler 103. The downlink scheduler 103B can be more simple compared to the uplink scheduler 103A. The downlink scheduler 103B can be used for transmission from the satellite to a group of user terminals or can be used for the point-to-point satellite to gateway transmission in both directions or in full-duplex. Thus, while the concepts discussed next are in the context of the satellite downlink, the concepts can also be applied to an uplink from a gateway to a satellite.

A group of user terminals will each receive in a broadcast a downlink radio frame from the satellite. Each user terminal in the group needs to obtain, from the downlink radio frame, the data meant for the respective user terminal. Information is needed by each user terminal to be able to identify their own data. Example information includes one or more of a start frequency, how many frequencies their data covers, a start time, how many time domain symbols are theirs, etc. Each user terminal has that information packed into a bitstream which is provided to the downlink scheduler 103B.

The input to the downlink scheduler 103B includes a buffer occupancy for all of the user terminals and all SFID (Service Flow IDs) computed at the MAC layer 402 based on received level 3 SDUs (Service Data Units) 408. The SFID has a set of quality of service parameters related to the type of data. For example, high priority data can be related to a VoiceOver IP stream which is in real time, versus browsing data or streaming video data which can be buffered and delayed if necessary. These parameters are tracked when performing the scheduling on the downlink.

The downlink scheduler 103B can also receive the SNR of the user terminals reported by the user terminals to determine the MCS via the link adaptation algorithm 324. The SNR of the user terminals provides data about the channel quality seen by each respective user terminal. Further, the input can include the number of user terminals to be scheduled in a radio frame. In one aspect, the report can be group-based and relate to the data in groups organized geographically or otherwise. For example, a group of 4 user terminals within 5 miles of each other can be reported with the respective data described above for input to the downlink scheduler 103B. The number of groups can be reported to the downlink scheduler 103B as well as the number of user terminals in each group.

In channel estimation OFDM symbols (272, 274, 276, 278), unique word OFDM symbols 260 and pilots per OFDM 280 can also be considered in the calculations disclosed herein with respect to the downlink scheduler 103B. So for example, if a burst in the time domain includes 5 OFDM symbols and there are 4 users in a group, one symbol might be used for channel estimation and the other 4 OFDM symbols can be for user data. Any one or more of these parameters can be included in or be used as a basis for a scheduling decision or grant allocation.

In one aspect, it is assumed that the user terminals are grouped as describe above for the uplink scheduler 103A in terms of geography or in some other manner. Thus, the grant allocation process that occurs in a round robin fashion as described below can be operating on one of the groups, and then move to another group. In another aspect, groups may not need to be organized and the process can apply to all the user terminals communicating with the satellite.

Like the uplink scheduler 103A, the downlink scheduler 103B will apply usually a 1.5 ms or a 1.3 ms radio frame length and thus the data related to the radio frame length discussed above is applicable also to the downlink scheduler 103B. Where there are multiple groups to schedule, the MAC scheduler 103 will pick one group at a time and then cycle through in a round robin fashion (or other approaches as well) to schedule each respective user terminal in a respective group of user terminals. While the uplink scheduler 103A is preferably limited, for example, to four users in a frame on the uplink, because the frame size of the downlink is larger, there is not the same kind of restriction. Thus, the downlink can, for example, schedule the downlink data for ten user terminals in one burst or frame of data.

Another difference between the downlink scheduler 103B and the uplink scheduler 103A is that on the downlink scheduler 103B, the zero bandwidth request users do not need to be scheduled and can be ignored. As will be seen in the method that follows, there is no selection of zero-bandwidth-request user terminals. Where there is such a user terminal, it can just be ignored by the downlink scheduler 103B.

An example method 700 for scheduling downlink communications can include selecting a number of non-zero buffer occupancy user terminal/service-flow-identification (SFID) pairs in a round robin fashion for a plurality of user terminals to yield a set of user terminals (702). The selecting step can also include calculating a required number of modulation symbols for each user terminal from the set of user terminals. The number of modulation symbols can relate to the number needed to empty the buffers containing data to transmit. As part of step (702), the downlink scheduler 103B can also determine an MEH MCS, which is the minimum of all the user terminal MCSs, can determine a GMH (Generic MAC Header) header size and determine the MEH header size. The MEH header size at this stage can be approximate if the system considers the current MEH header format. Otherwise, the system can provide a more accurate value at this stage if it considers a new MEH header format with other new functionality related to the MAC layer.

The method includes binning each user terminal of the set of user terminals into a plurality of bins based on a respective bandwidth requirement for each user terminal and based on a minimum user terminal grant (704).

The respective bandwidth requirement for a respective user terminal can be calculated as a number of required modulation symbols based on a number of code words times a number of symbols per code word and optionally plus a number of modulation symbols. The number of code words can be equal to ceil_div (buffer occupancy, bitsper_code_word). The ceil_div operation divides a/b without performing any floating point operations. In this case, it would divide (buffer occupancy) by the bitsper_code_word without any floating point operation. In other words, the number of code words is calculated based on the buffer occupancy and a bits per codeword value.

The minimum user terminal grant can be calculated based on a total number of modulation symbols divided by a number of user terminals. As a formula, the minimum user terminal grant is as follows:

$$min\_ut\_grant=total\_num\_modulation\_symb/num\_ut$$

where
total_num_modulation_symb=total_num_modulation_symb−GMH (Generic MAC Header) and MEH (multiplexing extended header) header symbols.

In one aspect, the plurality of bins includes one or more of a bandwidth request allocation bin for user terminals with zero-bandwidth requests (optional and likely not used in downlink grant allocations), a low-bandwidth bin, a medium-bandwidth bin and a high-bandwidth bin. Binning the second number of non-zero-bandwidth request user terminals from the plurality of user terminals into one of the low-bandwidth bin, the medium-bandwidth bin and the high-bandwidth bin based on the respective bandwidth requirement for each non-zero-bandwidth request user terminal and based on a minimum user terminal grant further can include a number of options. If a respective non-zero-bandwidth request user terminal has a respective bandwidth requirement that is less than a minimum user terminal grant, then the method includes adding the respective non-zero-bandwidth request user terminal to the low-bandwidth bin. If the respective non-zero-bandwidth request user terminal has a respective bandwidth requirement that is greater than the minimum user terminal grant and less than two times the minimum user terminal grant, then the method can include adding the respective non-zero-bandwidth request user terminal to the medium-bandwidth bin. Otherwise, the method includes adding the respective non-zero-bandwidth request user terminal to the high-bandwidth bin. The value of the medium-bandwidth bin having a ceiling of the minimum user terminal grant bin less than two times the minimum user terminal grant can be modified as well, such as to be based on three time or four times the minimum user terminal grant.

There can also be less or more bins used as well. For example, the bins can include a low bandwidth bin and a high bandwidth bin. There can be different gradations of the bins which generally start with lower bandwidth requirement bins and then uses bins associated with increasingly more bandwidth requirements.

The method further can include allocating, according to a grant allocation algorithm, a respective grant of radio resources in a downlink frame to each user terminal of the set of user terminals into a respective bin of the plurality of bins in an order associated with increasing bandwidth needs (706), generating, based on the allocating, a downlink map which identifies the respective grant of radio resources in the downlink frame to each user terminal of the set of user terminals (708) and applying, by the satellite, the downlink map for data broadcasted to the set of user terminals (710). The downlink frame is broadcast to all the users in a group of users. The downlink map can include essentially the radio resources each user terminal gets in the downlink frame. The downlink map can include a number of frequency domain resources and when the frequency domain resources start for a respect user terminal and a number of time symbols, and what the starting time is in the frame for the respective user terminal. Generally, the downlink map is used to generate the downlink frame which is received by each user terminal in a group and the respective user terminal identifies or extracts exactly where its allocated radio resources are in the downlink frame. The user terminal can therefore retrieve its data from the downlink frame received from the satellite according to the downlink map. That data can of course include the uplink map for how the respective user terminal positions its data on the uplink frame for transmission to the satellite.

In another aspect, the binning process could allocate grants first to high bandwidth user terminals and then progressively to lower bandwidth user terminals. The process could also involve a mixture of how the user terminals are allocated to bins which is not progressive from low to high bandwidth or from high to low bandwidth but based on other factors which could cause, for example, an order of allocating grants first to high bandwidth user terminal, followed by a lower bandwidth user terminal, and then followed by a medium bandwidth user terminal.

FIG. 8 illustrates the grant allocation algorithm 800 for the downlink in more detail. A method can include computing a user terminal grant based on an available modulation symbol value divided by a number of user terminals (802) and converting the available modulation symbol value into a bit value (804). The converting step is optional but used as a mechanism to calculate the grant in terms of bits rather than modulation symbol numbers. Other factors that can be taken into account is whether there is only one user terminal in a particular MCS bucket and is its allocation less than a codeword. Another consideration can be whether the total allocation of all the user terminals in a user terminal MCS bucket is less than a codeword. These and other considerations can be taken into account in the grant process described herein.

The method includes adding the MCS bucket defined as the unused modulation symbols (which is zero initially) to the user terminal grant (806), obtaining the unused user terminal grant after packing the SDUs (service data units) (808), or in other words, defining the unused user terminal grant in terms of modulation symbols. The method can include calculating a number of unused_code_words and residual code word modulation symbols from the unused user terminal grant (810), updating an available OFDM symbol value to be: available_ofdm_symb−(ut_grant−(unused_code_words*mod_symb_per_code_word)) (812), wherein available_ofdm_symb are the available OFDM symbols, the ut_grant is the user terminal grant, the unused_code_words are the number of unused_code_words, and the mod_symb_per_code_word the modulation number of symbols per code word. The method then includes updating the unused modulation symbols to be equal to the unused modulation symbols plus the residual code word modulation symbol value (814) and repeating steps (802) to (812) until all of the user terminal/SFID pairs are allocated (816).

In one aspect, the grant is based on the number of users and the supported bandwidth for each user terminal. Each user's bandwidth is determined, and the system bins the users and combines the data for scheduling each user. The downlink scheduler 103B enables the users with the same or similar MCS (based on user terminal channel quality) to be combined together and packed efficiently in the downlink radio frame. Each user terminal gets radio resources and some of the data described above can be provided to the RLC component 410 shown in FIG. 4 which will pack the user's data into a service data unit (SDU) based on the available or given grant which can form the SID PDUs.

FIG. 9 illustrates example computer device that can be used in connection with any of the systems disclosed herein. In this example, FIG. 9 illustrates a computing system 900 including components in electrical communication with each other using a connection 905, such as a bus. System 900 includes a processing unit (CPU or processor) 910 and a system connection 905 that couples various system components including the system memory 915, such as read only memory (ROM) 920 and random access memory (RAM) 925, to the processor 910. The system 900 can include a cache of high-speed memory connected directly with, in close proximity to, or integrated as part of the processor 910. The system 900 can copy data from the memory 915 and/or the storage device 930 to the cache 912 for quick access by the processor 910. In this way, the cache can provide a performance boost that avoids processor 910 delays while waiting for data. These and other modules can control or be configured to control the processor 910 to perform various actions. Other system memory 915 may be available for use as well. The memory 915 can include multiple different types of memory with different performance characteristics. The processor 910 can include any general purpose processor and a hardware or software service or module, such as service (module) 1 932, service (module) 2 934, and service (module) 3 936 stored in storage device 930, configured to control the processor 910 as well as a special-purpose processor where software instructions are incorporated into the actual processor design. The processor 910 may be a completely self-contained computing system, containing multiple cores or processors, a bus, memory controller, cache, etc. A multi-core processor may be symmetric or asymmetric.

To enable user interaction with the device 900, an input device 945 can represent any number of input mechanisms, such as a microphone for speech, a touch-sensitive screen for gesture or graphical input, keyboard, mouse, motion input, speech and so forth. An output device 935 can also be one or more of a number of output mechanisms known to those of skill in the art. In some instances, multimodal systems can enable a user to provide multiple types of input to communicate with the device 900. The communications interface 940 can generally govern and manage the user input and system output. There is no restriction on operating on any particular hardware arrangement and therefore the basic features here may easily be substituted for improved hardware or firmware arrangements as they are developed.

Storage device 930 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 925, read only memory (ROM) 920, and hybrids thereof.

The storage device 930 can include services or modules 932, 934, 936 for controlling the processor 910. Other hardware or software modules are contemplated. The storage device 930 can be connected to the system connection 905. In one aspect, a hardware module that performs a particular function can include the software component stored in a computer-readable medium in connection with the necessary hardware components, such as the processor 910, connection 905, output device 935, and so forth, to carry out the function.

In some cases, such a computing device or apparatus may include a processor, microprocessor, microcomputer, or other component of a device that is configured to carry out the steps of the methods disclosed above. In some examples, such computing device or apparatus may include one or more antennas for sending and receiving RF signals. In some examples, such computing device or apparatus may include an antenna and a modem for sending, receiving, modulating, and demodulating RF signals, as previously described.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The computing device may further include a display (as an example of the output device or in addition to the output device), a network interface configured to communicate and/or receive the data, any combination thereof, and/or other component(s). The network interface may be configured to communicate and/or receive Internet Protocol (IP) based data or other type of data.

The methods discussed above are illustrated as a logical flow diagram, the operations of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the methods disclosed herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but can have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

What is claimed is:

1. A method for uplink scheduling by a medium access control scheduler included in a satellite of a communication system, the method comprising:
   selecting, from a plurality of user terminals, a first number of zero-bandwidth request user terminals;
   selecting, from the plurality of user terminals, a second number of non-zero-bandwidth request user terminals;
   binning the second number of non-zero-bandwidth request user terminals into a plurality of bins based on a respective bandwidth requirement for each non-zero-bandwidth request user terminal;
   allocating a respective grant of radio resources in an uplink frame to each user terminal of the plurality of user terminals into a respective bin of the plurality of bins to yield an allocation;
   generating, based on the allocation, an uplink map which identifies the respective grant of radio resources in the uplink frame to each user terminal of the plurality of user terminals; and
   broadcasting, from the satellite, the uplink map to the plurality of user terminals.

2. The method of claim 1, wherein the respective bandwidth requirement for a respective user terminal is calculated as a number of required modulation symbols based on a number of code words times a number of symbols per code word plus a number of modulation symbols.

3. The method of claim 2, wherein the number of code words is calculated based on a total bandwidth required for the respective user terminal, a minimum or maximum size reported in a medium access control multiplexing extended header, and a bits per code word value.

4. The method of claim 1, wherein binning the second number of non-zero-bandwidth request user terminals into a plurality of bins is based on a minimum user terminal grant, wherein the minimum user terminal grant is calculated based on a minimum number of orthogonal frequency division multiplexing symbols, a number of frequency domain resource blocks, an uplink maximum user terminals per burst and a number of sub carriers per resource block.

5. The method of claim 1, wherein the plurality of bins comprises one or more of a bandwidth request allocation bin for user terminals with zero-bandwidth requests, a low-bandwidth bin, a medium-bandwidth bin and a high-bandwidth bin.

6. The method of claim 5, wherein binning the second number of non-zero-bandwidth request user terminals comprises binning into one of the low-bandwidth bin, the medium-bandwidth bin and the high-bandwidth bin based on the respective bandwidth requirement for each non-zero-bandwidth request user terminal and based on a minimum user terminal grant further comprises:
  if a respective non-zero-bandwidth request user terminal has a respective bandwidth requirement that is less than a minimum user terminal grant, then adding the respective non-zero-bandwidth request user terminal to the low-bandwidth bin;
  if the respective non-zero-bandwidth request user terminal has a respective bandwidth requirement that is greater than the minimum user terminal grant and less than 2 times the minimum user terminal grant, then adding the respective non-zero-bandwidth request user terminal to the medium-bandwidth bin; and
  otherwise, adding the respective non-zero-bandwidth request user terminal to the high-bandwidth bin.

7. The method of claim 1, wherein allocating the respective grant of radio resources further comprises:
  (1) forming the plurality of user terminals into bursts;
  (2) computing an available burst length for each burst of the bursts;
  (3) allocating the respective grant of radio resources to each respective user terminal of the plurality of user terminals for a respective burst of the bursts by performing operations comprising:
    (a) determining a total number of modulation symbols required for all user terminals having data in the respective burst of the bursts;
    (b) determining a number of required resource blocks for the respective burst of the bursts;
    (c) determining a required burst length for the respective burst of the bursts; and
    (d) determining an unused burst length for the respective burst of the bursts, to yield the respective grant of radio resources to each respective user terminal to the respective burst of the bursts;
  (4) determining an update of how many available symbols exists; and
  (5) repeating steps (2) to step (4) until all the bursts are allocated.

8. The method of claim 7, wherein forming the plurality of user terminals into bursts is based at least in part on an uplink maximum user terminal value per burst.

9. The method of claim 1, wherein the method is practiced in a round robin fashion across each user terminal of the plurality of user terminals.

10. The method of claim 9, wherein the plurality of user terminals comprises a set of groups of user terminals in which a first group of user terminals is allocated the respective grant of radio resources in the round robin fashion and thereafter a second group of user terminals is allocated the respective grant of radio resources in the round robin fashion.

11. The method of claim 1, wherein selecting, from a plurality of user terminals, of the first number of zero-bandwidth request user terminals from the plurality of user terminals and selecting, from the plurality of user terminals, of the second number of non-zero-bandwidth request user terminals from the plurality of user terminals are both done in a round robin fashion.

12. The method of claim 1, wherein prior to selecting, from a plurality of user terminals, of the first number of zero-bandwidth request user terminals and selecting, from the plurality of user terminals, of the second number of non-zero-bandwidth request user terminals, the plurality of user terminals is grouped into different groups.

13. The method of claim 1, wherein wherein allocating the respective grant of radio resources in the uplink frame to each user terminal of the plurality of user terminals to yield the allocation comprises allocating into the respective bin of the plurality of bins in an order associated with bandwidth needs.

14. The method of claim 1, wherein the plurality of bins comprises one or more of a bandwidth request allocation bin for user terminals with zero-bandwidth requests, a low-bandwidth bin, a medium-bandwidth bin and a high-bandwidth bin.

15. A method for downlink scheduling by a satellite included in a communication system, the method comprising:
  selecting a number of non-zero buffer occupancy user terminal/service-flow-identification (SFID) pairs in a round robin fashion from a plurality of user terminals to yield a set of user terminals;
  binning each user terminal of the set of user terminals into a plurality of bins based on a respective bandwidth requirement for each user terminal;
  allocating a respective grant of radio resources in a downlink frame to each user terminal of the set of user terminals into a respective bin of the plurality of bins to yield an allocation;
  generating, based on the allocation, a downlink map which identifies the respective grant of radio resources in the downlink frame to each user terminal of the set of user terminals; and
  applying the downlink map for data broadcasted to the set of user terminals.

16. The method of claim 15, further comprising:
  calculating a required number of modulation symbols for each user terminal from the set of user terminals.

17. The method of claim 15, further comprising determining one or more of a multiplexing extended header (MEH) modulation and coding scheme (MCS), a minimum of all user terminal MCSs, a generic MAC header (GMH) size and a MEH header size.

18. The method of claim 15, wherein allocating the respective grant of radio resources further comprises:
  (1) computing a user terminal grant based on an available modulation symbol value divided by a number of user terminals in the set of user terminals;
  (2) adding an unused modulation symbol to the user terminal grant to yield an unused user terminal grant;
  (3) obtaining the unused user terminal grant after packing service data units (SDUs);
  (4) calculating a number of unused code words and residual code word modulation symbols from the unused user terminal grant;
  (5) updating an available OFDM (orthogonal frequency division multiplexing) symbol value to be: available_ofdm_symb−(a user terminal grant−(unused_code_words*mod_symb_per_code_word));
  (6) updating the unused modulation symbol to be equal to the unused modulation symbol plus a residual code word modulation symbol value; and
  (7) repeating steps (1) to (5) until all of the number of non-zero buffer occupancy user terminal/SFID pairs are allocated.

19. The method of claim 18, wherein allocating the respective grant of radio resources is performed by a grant allocation algorithm that packs user terminals with similar or a same MCS into a same downlink frame.

20. A satellite comprising:
- a processor; and
- a computer-readable storage device storing instructions which, when executed by the processor, cause the processor to perform operations comprising:
  - selecting, from a plurality of user terminals, a first number of zero-bandwidth request user terminals;
  - selecting, from the plurality of user terminals, a second number of non-zero-bandwidth request user terminals;
  - binning the second number of non-zero-bandwidth request user terminals into a plurality of bins based on a respective bandwidth requirement for each non-zero-bandwidth request user terminal;
  - allocating a respective grant of radio resources in an uplink frame to each user terminal of the plurality of user terminals into a respective bin of the plurality of bins to yield an allocation;
  - generating, based on the allocation, an uplink map which identifies the respective grant of radio resources in the uplink frame to each user terminal of the plurality of user terminals; and
  - broadcasting, from the satellite, the uplink map to the plurality of user terminals.

21. The method of claim 13, wherein the plurality of bins and the order associated with bandwidth needs comprise:
- first, to a low-bandwidth bin for low-bandwidth user terminals from the second number of non-zero-bandwidth request user terminals;
- second, to a medium-bandwidth bin for medium-bandwidth user terminals from the second number of non-zero-bandwidth request user terminals; and
- third, to a high-bandwidth bin for high-bandwidth user terminals from the second number of non-zero-bandwidth request user terminals.

22. The method of claim 15, wherein allocating the respective grant of radio resources in the downlink frame to each user terminal of the set of user terminals to yield the allocation comprises allocating into the respective bin of the plurality of bins in an order associated with bandwidth needs.

23. The satellite of claim 20, wherein allocating the respective grant of radio resources in the uplink frame to each user terminal of the plurality of user terminals to yield the allocation comprises allocating into the respective bin of the plurality of bins in an order associated with bandwidth needs.

* * * * *